United States Patent [19]
Pawlowski

[11] Patent Number: 5,592,685
[45] Date of Patent: Jan. 7, 1997

[54] SYNCHRONOUS/ASYNCHRONOUS PARTITIONING OF AN ASYNCHRONOUS BUS INTERFACE

[75] Inventor: Chester W. Pawlowski, North Chelmsford, Mass.

[73] Assignee: Digital Equipment Corporation, Maynard, Mass.

[21] Appl. No.: 957,977

[22] Filed: Oct. 7, 1992

[51] Int. Cl.⁶ .......................... G06F 13/14; G06F 13/20
[52] U.S. Cl. ................ 395/882; 395/308; 395/309; 364/DIG. 1; 364/270.5; 364/DIG. 2; 364/942.4; 364/950.1
[58] Field of Search ................................ 395/325, 275, 395/308, 309, 882, 884

[56] References Cited

U.S. PATENT DOCUMENTS

| | | | |
|---|---|---|---|
| 3,999,163 | 12/1976 | Levy et al. | 340/172.5 |
| 4,390,969 | 6/1983 | Hayes | 364/900 |
| 4,442,504 | 4/1984 | Dummermuth et al. | 395/275 |
| 4,615,017 | 9/1986 | Finlay et al. | 364/900 |
| 4,878,173 | 10/1989 | Goekjian | 364/200 |
| 4,965,801 | 10/1990 | DuLac | 371/40.1 |
| 4,999,769 | 3/1991 | Costes et al. | 364/200 |
| 5,029,124 | 7/1991 | Leahy et al. | 364/900 |
| 5,097,437 | 3/1992 | Larson | 395/775 |
| 5,255,375 | 10/1993 | Crook et al. | 395/325 |
| 5,265,216 | 11/1993 | Murphy et al. | 395/325 |

OTHER PUBLICATIONS

IBM Technical Disclosure Bulletin, vol. 34, No. 4B, Sep. 1991, New York, US pp. 140–142 XP189537.
Peyton et al. "A Futurebus Interface from Off-the-Shelf Parts" IEEE Micro, 1991 pp. 38–41, 84–93.

Primary Examiner—Thomas C. Lee
Assistant Examiner—D. Dinh
Attorney, Agent, or Firm—Mark J. Casey; Denis G. Maloney; Arthur W. Fisher

[57] ABSTRACT

An apparatus which provides a high data transfer rate to and from an asynchronous bus. The apparatus includes a synchronous logic network to provide a transaction connection between the asynchronous bus and the data transfer device during an initial phase of the transaction when many determinations are required and an asynchronous logic network to provide data transfer between the asynchronous bus and the data transfer device during a subsequent phase of the transaction when very few determinations are required.

17 Claims, 11 Drawing Sheets

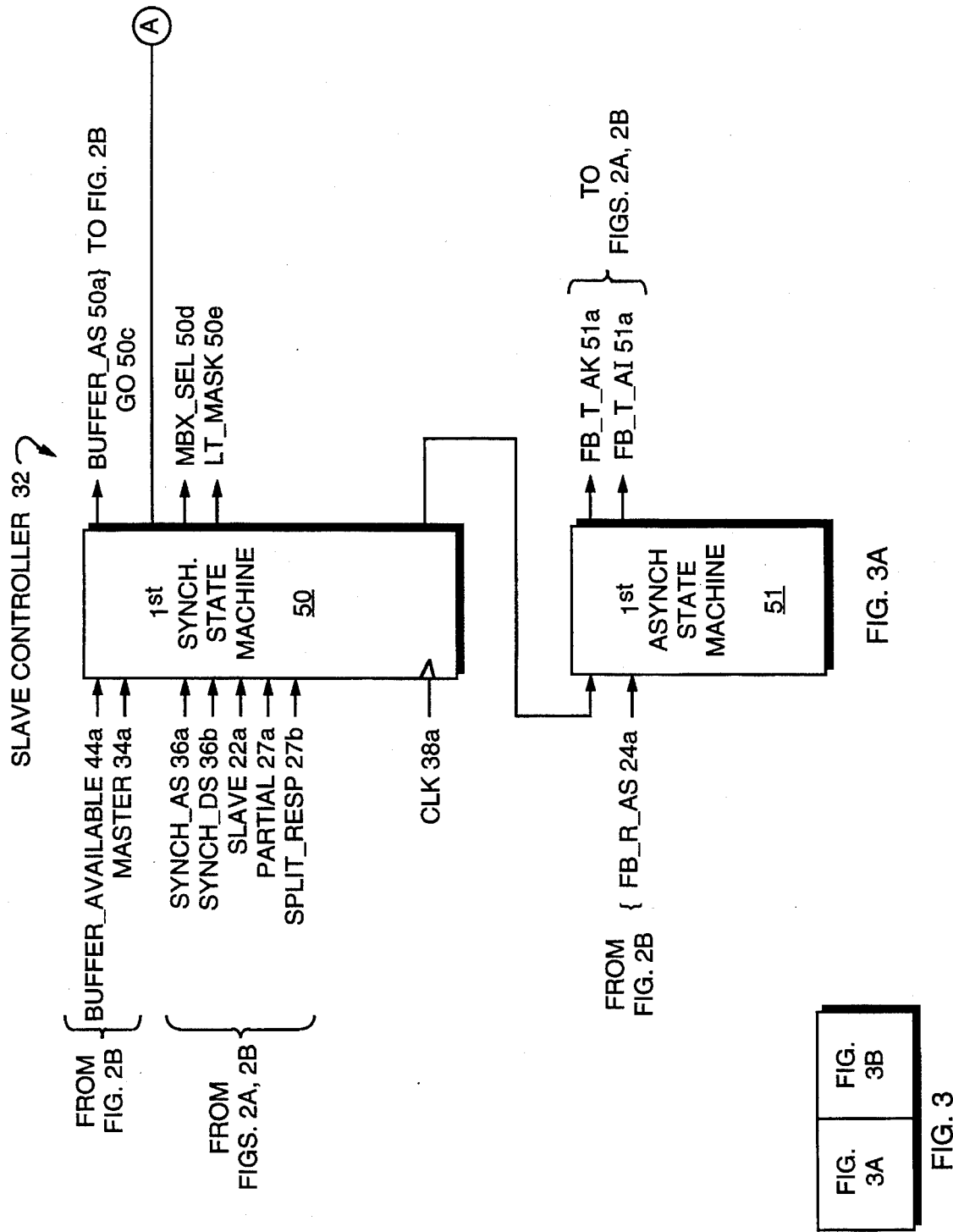

FIG. 6

| CURRENT STATE Y0,Y1 | FB_R_AS 24a | NO_CONN_HOLD 50b | NEXT STATE Y0¹,Y1¹ | FB_T_AK 51a | FB_T_AI 51b |
|---|---|---|---|---|---|
| 0 0 | 0 | X | 0 0 | 0 | 1 |
| 0 0 | 1 | X | 0 1 | 1 | 1 |
| 0 1 | 0 | X | 0 0 | 0 | 1 |
| 0 1 | 1 | 0 | 0 0 | 1 | 1 |
| 0 1 | 1 | 1 | 1 1 | 1 | 0 |
| 1 1 | 1 | X | 1 1 | 1 | 0 |
| 1 1 | 0 | X | 1 0 | 1 | 1 |
| 1 0 | 0 | 0 | 0 0 | 1 | 1 |
| 1 0 | 0 | 1 | 1 0 | 0 | 1 |

|  | FB_R_AS 24a, NO_CONN_HOLD 50b | | | |
|---|---|---|---|---|
| CURRENT STATE Y0, Y1 | 00 | 01 | 11 | 10 |
| 00 | 0 | 0 | 1 | 1 |
| 01 | 0 | 0 | 1 | 0 |
| 11 | 1 | 1 | 1 | 1 |
| 10 | 1 | 1 | 1 | 0 |

AK = [{(NOT Y0) AND FB_R_AS 24a} OR {Y0 AND Y1} OR {Y0 AND (NOT FB_R_AS 24a) AND NOT NO_CONN_HOLD 50b} OR {Y1 AND FB_R_AS 24a}]

FIG. 7

SYNCHRONOUS/ASYNCHRONOUS PARTITIONING OF AN ASYNCHRONOUS BUS INTERFACE

BACKGROUND OF THE INVENTION

This invention relates generally to computer systems, and more particularly to the transfer of data between a data transfer device an asynchronous portion of a computer system.

As it is known in the art, computer systems generally include at least one central processing unit (CPU), a main memory for storing data, at least one input/output (I/O) device, and a system bus coupling the aforementioned devices to the CPU. The I/O device generally has a port which is coupled to an I/O bus which provides for access to one or more peripherals.

Generally, I/O devices are used to transfer data between the system bus and the I/O bus such that peripherals resident on the I/O bus are coupled to the remainder of the computer system. Many different types of peripherals, such as mass storage devices, i.e., disk drives, tape drives, etc., printers, other computer systems, and other I/O busses, etc., may be resident on the I/O bus. These peripherals generally have many different characteristics, including the speed at which they operate. Often, to take advantage of the operating speed of the fastest devices while still allowing slower devices to operate on the I/O bus, the I/O bus is provided as an asynchronous bus. An asynchronous bus is one in which there is no common clock or timing signal from which other signals, such as address, data, and control signals, are related. A synchronous bus is one is which all devices on the bus assert and deassert bus signals relative to transitions, i.e., assertions and/or deassertions, of a common clock or timing signal.

Asynchronous busses generally operate via handshake signals sent between devices on the bus. Each handshake signal is usually associated with one or more bus signals, and if one device causes a transition of a handshake signal, for example, an address strobe handshake signal, this usually indicates that its associated signals, i.e., the address signals, are valid. All appropriate devices on the bus will assert a corresponding handshake signal to indicate that they received the signals, i.e., address signals. In this manner, a fast device can communicate with a slow device by waiting for the slow device's related handshake signals which allows each device to operate as fast as possible.

Generally, it is necessary in a computer system such as the one described above, to transfer data to and from the asynchronous I/O bus. Prior techniques use a bus interface circuit to control transfers with the asynchronous bus. One technique synchronizes the asynchronous bus handshake signals prior to using them. A problem with this approach is that it limits the speed of the data transfer rate. An alternative approach is to use an asynchronous interface to transfer data with the asynchronous bus. An advantage of this approach is that data transfer on the asynchronous bus is very fast. A disadvantage is that the asynchronous interface is generally very complicated and expensive.

As is also known, a bus transaction, whether synchronous or asynchronous, generally involves a command/address phase or cycle, which may be an initial transfer of information related to the transaction being initiated, followed by a data phase or cycle, which may be many transfers of data. A device performs a transaction on the bus by first gaining access to the bus through some form of bus arbitration. After gaining access, the device begins the transaction by sending a command and an address on the bus (command/address phase). All devices on the bus examine the address and command. The devices often check for parity and other errors. The devices also decode the address to determine if they are a target, hereinafter referred to as a bus slave device, of the transaction. The bus slave device or devices must further decode the command and address information to determine the appropriate logical path to follow. Busses, particularly I/O busses where many different types of peripherals having different characteristics may reside, are very complicated. There may be several ways for a device to proceed after decoding the address and command information.

Whether the bus is a synchronous or asynchronous bus, transaction control of the bus is often provided by state machines, i.e., sequential circuits. One type of state machine is a synchronous state machine which uses storage elements called flip-flops that are allowed to change their binary value only at discrete instants of time. Synchronous state machines generally include combinatorial logic circuits which implement so called "state equations". The state equations define the operation or flow of the state machine. In response to the outputs from the combinatorial logic circuits, the flip-flops generate output bits termed state bits which define the states of the state machine. The combinatorial logic receives inputs from external logic and the flip-flops, and provides outputs to external logic and to the flip-flops. The transition of a clock signal allows the flip-flops to operate on their input signals to produce the next output states of the flip-flops. The cycle time, i.e., assertion edge to assertion edge, of the clock signal may be chosen to be the smallest value which will allow the flip-flops to operate on their input signals and allow the combinatorial logic to operate on the changed inputs from the flip-flops. Therefore, the clock signal may not transition until the flip-flop inputs are valid, i.e. settled from transition, "glitch-free", or "noise-free", and have been valid for at least a time equal to the input set up time of the flip-flops. While this requirement prevents the synchronous state machine from changing state prematurely or incorrectly due to glitches, it also limits the speed of the state machine to the clock cycle which is limited to the propagation delay through the slowest path.

An I/O device which utilizes a synchronous state machine to transfer data with an asynchronous bus must also synchronize all the received asynchronous bus handshake signals prior to using them. To synchronize asynchronous signals, a two stage flip-flop apparatus may be used, i.e., a dual stage synchronizer. With a dual stage synchronizer, the asynchronous signal is fed to a first flip-flop input and the synchronizing clock is used to allow the signal value to pass through the flip-flop appearing at an output of the first flip-flop if the signal reaches the flip-flop prior to the clock transition. The output from the first flip-flop is then fed into an input of a second flip-flop which is controlled in a similar fashion by the clock signal. The two stages are necessary to prevent metastability, i.e., if the asynchronous signal transitions at or just before the clock transition, the output from the first flip-flop may not be stable. The second flip-flop allows an entire clock cycle for the first flip-flop's output to stabilize before passing the value of the signal to its output. The synchronous state machine may then operate on the output of the second flip-flop on a next clock transition. Worse case, the asynchronous signal will transition just after the clock transition, and the first flip-flop will not pass the value on until the following clock transition. If this happens, then the synchronous state machine will not operate on the signal until a fourth clock transition. Accordingly, a problem with using a synchronous state machine to interface to an asynchronous bus is that it requires circuitry to synchronize the received asynchronous handshake signals. This circuitry or "synchronizer" introduces a high latency period between data being ready to transfer and data being transferred since the synchronizer invariably delays transitions of the asynchronous signals by up to three to four clock cycles.

Another type of state machine is the asynchronous state machine. Asynchronous state machines are basically combinatorial circuits with feedback paths whose outputs depend upon the order in which its input variables change. Similar to the synchronous state machine, the combinatorial logic implements state equations which define the operation/flow of the state machine. However, there are no storage elements, i.e., flip-flops, and, therefore, the outputs of the asynchronous state machine may be affected at any instant of time by changes in any inputs to the state machine. The combinatorial logic which comprises the asynchronous state machine generates the state bits and other output signals, and, therefore, changes from one state to the next are not controlled by a clock signal like the synchronous state machine. Thus, the asynchronous state machine changes states as fast as the combinatorial logic can operate on the received signals. In general, an asynchronous state machine interface to an asynchronous bus is much faster than the aforementioned synchronous state machine. To prevent glitches on state bits from forcing the asynchronous state machine into invalid states, only one state bit is permitted to change each time the state machine changes state. Therefore, only that state bit has the possibility of glitching and, thus, the asynchronous state machine will not transition to an incorrect state. In general, this leads to a large number of required states and, therefore, to a large number of state bits which increase the amount of circuitry necessary to implement the state machine.

Asynchronous state machines must also be designed to be hazard proof. A hazard may occur where inputs to the state machine are changing, and, thus, the state of the state machine is changing, but some outputs of the state machine are suppose to remain steady. In this case, as the state is changing, an output may momentarily change (i.e., glitch) to a different level than the steady value which may cause the state machine to improperly move to an incorrect state. To overcome this problem, the asynchronous state machine equations are provided with added terms, i.e., hazard terms, to prevent these possible glitches from causing transitions to wrong states. These added hazard terms further increase the amount of circuitry required to implement the asynchronous state machine.

Accordingly, use of asynchronous interfaces to interface to an asynchronous bus is the preferred approach if speed is a primary objective. However, as computer systems become more complex, bus structures associated with these systems become more complex. One problem with using an asynchronous interface to interface to such a complex bus, therefore, is that the interface becomes correspondingly complex, and as the complexity of the bus structure increases, the size and cost of the interface increases concomitant therewith.

In addition to the situation mentioned above, there are many other situations in which data must be transferred with an asynchronous bus. The above mentioned system bus may be synchronous or asynchronous. If the system bus is asynchronous, the difficulties involved with interfacing to an asynchronous bus occur when interfacing to the system bus.

SUMMARY OF THE INVENTION

In accordance with the present invention, a data transfer device includes means for controlling data transfer with an asynchronous bus. The means for controlling data transfer includes a synchronous logic network to provide a transaction connection between the asynchronous bus and the data transfer device during an initial phase of the transaction and an asynchronous logic network to provide data transfer between the asynchronous bus and the data transfer device during a subsequent phase of the transaction. With such an arrangement, the synchronous logic network can provide transaction control during a time when many determinations are required to be made by the data transfer device. Although the synchronous logic network may be slower than a corresponding asynchronous logic network, it is provided with significantly less circuitry than the asynchronous logic network. On the other hand, the asynchronous logic network provides transaction control during a time when few determinations need to be made by the data transfer device. Thus, while a corresponding synchronous logic network may be implemented in slightly less hardware than the asynchronous logic network, the synchronous logic network would be significantly slower than the asynchronous logic network. Therefore, a data transfer device is provided having a minimal amount of circuitry, while providing data transfer at a high rate of speed.

In accordance with a further aspect of the present invention, a data transfer device includes means for interfacing to an asynchronous bus and means for controlling data transfer between the asynchronous bus interfacing means and the asynchronous bus. The means for controlling data transfer between the asynchronous bus interfacing means and the asynchronous bus includes, means for synchronously controlling an initial connection phase of a transaction and means for asynchronously controlling a subsequent data transfer phase of the transaction. With such an arrangement, the synchronous controlling means provides transaction control during an initial connection phase when many determinations are required to be made by the data transfer device. The synchronous controlling means although typically slower than a corresponding asynchronous controlling means, is implemented with significantly less circuitry. On the other hand, the asynchronous controlling means provides transaction control during a subsequent data transfer phase when few determinations need to be made by the data transfer device. Accordingly, the asynchronous controlling means is implemented in slightly less hardware than a corresponding synchronous controlling means and is correspondingly faster than a synchronous controlling means. Thus, a data transfer device is provided having a minimal amount of circuitry, while providing data transfer at a high rate of speed.

BRIEF DESCRIPTION OF THE DRAWINGS

FIG. 2 is a diagram showing the relationship of FIGS. 2A and 2b as spanning two drawing sheets;

FIG. 3 is a diagram showing the relationship of FIGS. 3A and 3b as spanning two drawing sheets;

FIGS. 3a and 3b are a more detailed block diagram of the slave controller of FIGS. 2a, 2b in accordance with the invention;

FIG. 6 is a truth table illustrating the operation of the first asynchronous state machine of FIGS. 3a, 3b;

FIG. 7 is a Karnaugh map illustrating the conditions under which a specific output signal displayed in the truth table of FIG. 6 is asserted;

DETAILED DESCRIPTION OF THE PREFERRED EMBODIMENTS

As noted above, this invention involves a method and apparatus for transferring data to and receiving data from an asynchronous system such as an asynchronous bus. An interface apparatus to the asynchronous bus is divided into a synchronous section and an asynchronous section. An initial portion of a transaction on the asynchronous bus is controlled by the synchronous section while a subsequent data transfer portion of the transaction is controlled by the asynchronous section. This reduces the amount of circuitry required to provide the interface apparatus while providing for fast data transfer with the asynchronous bus through the interface apparatus.

Figure 1:
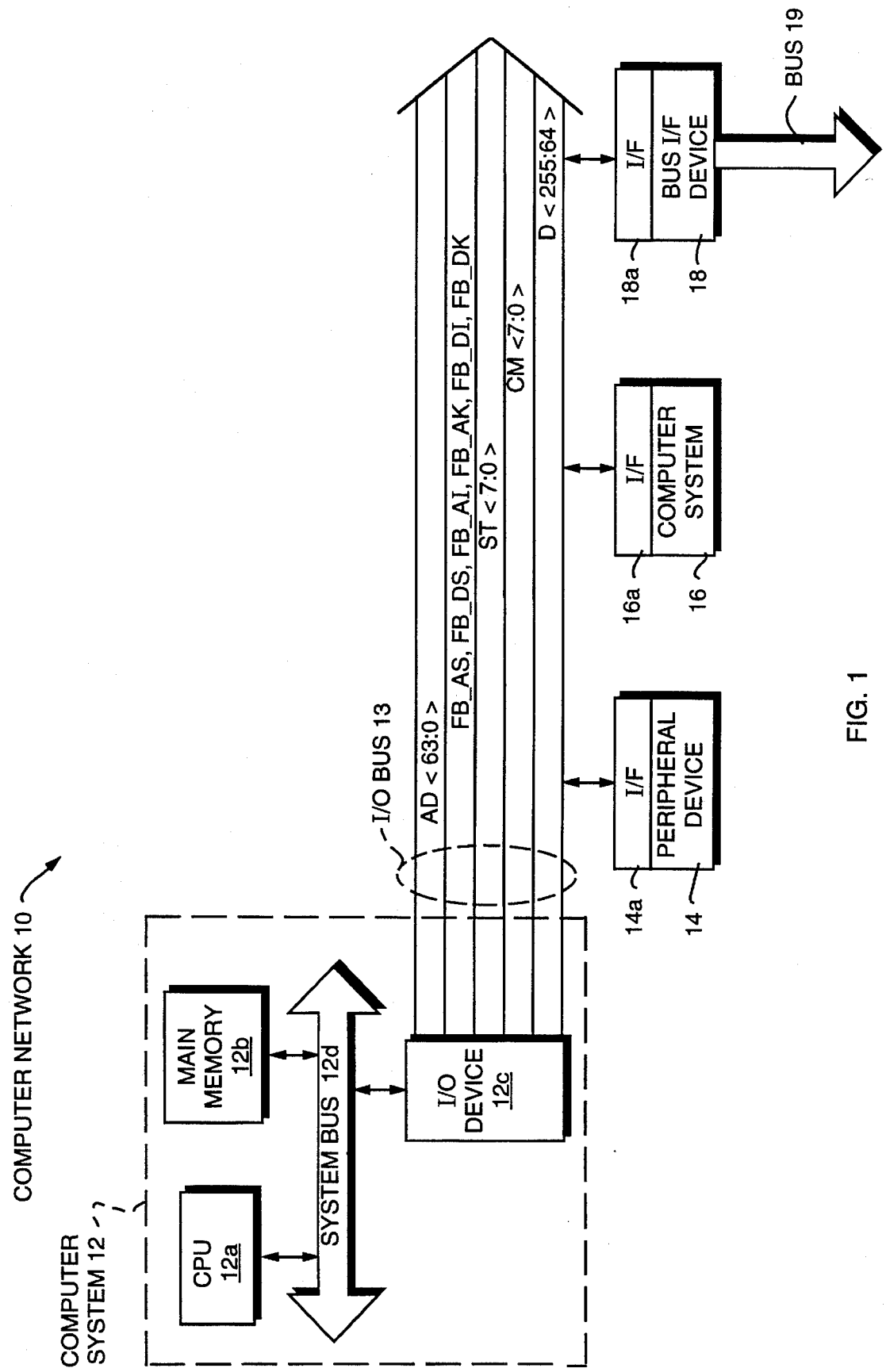
FIG. 1 is a block diagram of a computer network having a system bus connected to an I/O bus by an I/O device in accordance with the invention.

Referring now to FIG. 1, a computer network 10 is shown to include a computer system 12 which includes a central processing unit (CPU) 12a, a main memory module 12b, and an input/output (I/O) device 12c coupled together by a system bus 12d. There may be multiple CPUs, main memory modules, and I/O devices resident on the system bus, although only one of each is shown in FIG. 1 for simplicity. The computer network 10 further includes an I/O bus 13 used to couple the computer system to a peripheral device 14, a second computer system 16 which may be the same type of system as computer system 12 or may be a different type of computer system, and a bus interface 18. Examples of peripheral devices which may be coupled to the bus 13 include, tape drives, disk drives, printers, etc. There may be multiple peripherals, computer systems, and bus interfaces, i.e., devices designed to transfer data between at least two busses, resident on the I/O bus, although only one of each is shown in FIG. 1 for simplicity. Here each of the devices 14, 16, and 18 have corresponding interface apparatus 14a, 16a, and 18a, as shown, to interface the respective device to the I/O bus 13. As also shown, bus interface device 18 is disposed to interface I/O bus 13 to a third bus 19 which may be a computer system bus (as bus 12d) or another network bus (as bus 13).

The I/O device 12c is provided to accommodate the transfer of data between the I/O bus 13 and the system bus 12d. In this example, the system bus 12d and the devices resident on the system bus operate synchronous to a common clock signal, while the I/O bus 13 and the devices resident on the I/O bus operate asynchronously. Accordingly, the I/O device 12c is used to transfer data between the synchronous computer system and the asynchronous I/O bus.

Often, the I/O bus 13 couples together devices which may have different characteristics. A flexible protocol, i.e., a predetermined bus control technique through which data may be transferred over the bus, on the I/O bus 13 is here implemented to accommodate various characteristics of different devices coupled to bus 13, and allow such devices to operate optimally. An example of a flexible protocol for the I/O bus 13 is the so called "Futurebus+" (FBUS) protocol as set forth in specifications provided by the Institute for Electrical and Electronic Engineers, including IEEE STD. 896.1-1991: Logical Layer Specification. As an illustrative example, the I/O device 12c will be described with respect to interfacing to an I/O bus 13 implementing the FBUS protocol. It will be appreciated, however, that I/O device 12c has applicability to other types of busses and that description of the FBUS is illustrative of one preferred embodiment of the invention. A brief description of the FBUS will first be given before proceeding further.

The FBUS is a low assertion bus, (i.e., an asserted signal is at a lower voltage level than a deasserted signal). Often the system bus 12d is a high assertion bus, (i.e., an asserted signal is at a higher voltage level than a deasserted signal). The I/O device 12c must respond correctly to the assertion levels of each. Hereinafter, asserted and deasserted refer to the appropriate assertion and deassertion logic levels for the respective bus.

When a device, such as the I/O device 12c, peripheral 14, computer system 16, and bus interface 18, shown in FIG. 1, engage in a transaction using the bus 13, the devices gain control of the bus through a process known as "arbitration". Arbitration is one step in implementing a protocol in which a device called an FBUS master device is chosen from among competing devices for use of the bus 13 for a given period of time referred to as a "transaction" The bus master device is one of the devices involved in a transaction and is selected by an arbiter (not shown). There are many different types of arbitration techniques known in the art. The FBUS employs a central arbiter (not shown) to which all devices on the FBUS wanting to gain control of the FBUS, i.e., become an FBUS master device, send a bus request signal. The central arbiter grants control of the FBUS to one of the devices which sent a bus request signal, according to a predetermined scheme which distributes such control among the various devices which desire to gain access to the bus. Schemes which are implemented by the arbiter include, priority schemes, round-robin schemes, and so forth. Typically, when a device is issued a grant from the arbiter, it gains the status of bus master elect. The device will actually exercise control, i.e., become the bus master device, when any current transaction on the bus is completed.

Once a device gains control of the bus, i.e., becomes a bus master device, the bus master device sends address and command information onto appropriate bus lines to begin a connection phase. Described below are some of the standard signals implemented by the FBUS. These signals will be described below, in conjunction with FIGS. 1–2. For FBUS 13, the address is here placed on FBUS address/data lines (AD) sixty-three to zero, i.e., AD<63:0>, and the command is placed on FBUS command lines (CM) seven to zero, i.e., CM<7:0>. The command lines in the connection phase indicate which AD lines contain valid data, i.e., AD<31:0> and possibly AD<63:32>. After asserting the appropriate command and address bits, the FBUS master device will assert an address synchronization handshake signal, i.e., FB_AS, to indicate that the bus lines contain valid data and that all modules resident on the bus should examine the data. The devices on the bus respond by asserting an address acknowledge signal, i.e., FB_AK, capturing the address and command information on the bus. The bus slave device immediately asserts a data acknowledge inverse handshake signal, i.e., FB_DI, for later use. The responding devices decode the address to determine if they are a target of the transaction, i.e., a bus slave device, and decode the command to determine what type of transaction has been initiated. The devices also check for parity and other errors. For example, if a command when decoded is determined to be for a transaction which the bus slave device is incapable of handling, an error is signaled.

The FBUS provides eight status lines (ST), i.e., ST<7:0>, for responding devices to use to notify the bus master device of significant events, such as, that they are a target of the transaction or that there are errors, etc. Once the address has been decoded, at least one device has determined that it is a target, i.e., bus slave device, of the transaction, or there are errors. The bus slave device asserts the appropriate status line on the FBUS and when the device is prepared to continue to the next phase of the transaction, the device deasserts an address acknowledge inverse handshake signal, i.e., FB_AI. All devices, including those which are not a target of the transaction, deassert the FB_AI signal as a confirmation to the bus master device that they have decoded the address and checked for errors.

Following the deassertion by all devices on the bus of the FB_AI signal, the bus master device may proceed to the data transfer phase. At the beginning of the data phase, the bus master device may provide information through the command lines to the bus slave device as to the amount of data which will be transferred in the current transaction. Data may be transferred between the bus master device and the bus slave device over the AD<63:0> lines and data lines two hundred and fifty-five to sixty-four, i.e., D<255:64>. The command information sent by the bus master device in the connection phase will indicate which of the available lines, i.e., the data width, will contain valid data, i.e., AD<31:0> and possibly AD<63:32>, D<127:64>, and D<255:128>, and whether the transaction is to transfer data to the bus slave device, i.e., write, or request data from the bus slave device, i.e., read. If the transaction is a write, the bus master device places the data to be transferred on the appropriate bus lines upon detecting the deassertion of the FB_AI signal and asserts a data synchronization handshake signal, i.e., FB_DS. If the transaction is a read, the bus master device immediately deasserts the address and asserts the FB_DS signal upon detecting the deassertion of the FB_AI signal. Upon detecting the assertion of the FB_DS signal, for a read or a write, the bus slave device responds immediately by asserting a data acknowledge handshake signal, i.e., FB_DK, for later use. In the case of a read, the bus slave device then prepares to place data on the bus, and if the bus master device provided information as to the amount of data which is to be transferred, the bus slave device may use this information to more efficiently transfer the data from main memory 12b (FIG. 1) to the bus master device.

After the bus slave device has captured data on the bus lines (a write operation from the bus master device), or placed data onto the bus lines (a read operation from the bus master device), the bus slave device deasserts the FB_DI signal. This indicates to the bus master device that the bus slave device has removed data from or provided data onto the bus and has also provided status, i.e., ST<7:0>, onto the bus. The bus master device then provides more data (for a write) or captures the data sent by the bus slave device (for a read), and captures the status sent by the bus slave device. When the bus master device is ready for the next data transfer, the bus master device deasserts the FB_DS signal. Both the asserting edge and deasserting edge of the FB_DS signal are used to transfer data. The asserting edge of the FB_DS signal signifies the beginning of an "odd data beat", while the deasserting edge of the FB_DS signal signifies the beginning of an "even data beat". The bus slave device responds to the deassertion of the FB_DS signal immediately with the re-assertion of the FB_DI signal, for later use. When the bus slave device has again removed data or provided data, and provided status, the bus slave device deasserts the FB_DK signal. The deassertion of the FB_DK signal indicates that the bus slave device has completed the even data beat, i.e., the bus slave device has either removed data or provided data, and provided status (the earlier deassertion of the FB_DI signal indicates that the bus slave device completed the odd data beat).

In general, a plurality of such data beats occur in a similar way as outlined above. When the bus master device is done sending or receiving data, the bus master device deasserts the FB_AS signal and enters the disconnection phase. The bus slave device immediately asserts the FB_AI signal and then deasserts the FB_DI signal and the FB_DK signal as necessary depending on whether the last data transfer was an even or an odd data beat. The bus master device then deasserts the FB_DS signal if the last data transfer was an odd data beat. Following this, the bus slave device asserts any appropriate status and in certain situations captures information from the data lines sent by the bus master device and then deasserts the FB_AK signal. The bus master device then captures the status and the transaction is ended.

Flexible protocols allow for many devices, having different capabilities, to transfer data with each other. However, this flexibility generally adds complexity. Sophisticated devices may be allowed to transfer data with similarly sophisticated devices or with less sophisticated devices. At the beginning of a transaction many determinations need to be made about the transaction which is to be carried out and about how the transaction is to be carried out. These determinations take time and may require the bus master device or the bus slave device to respond in certain ways. In the case of the FBUS, most of these determinations are made in the connection phase, while the subsequent data phase requires relatively few determinations at the beginning of the data phase. One determination for the FBUS is the type of transaction to be carried out, for example, read, write, partial, split, etc. All these transactions are described in detail in the IEEE Std. 896.1-1991. Other determinations include which address lines are to be used, which data lines are to be used, how much data is to be transferred, etc. Each determination requires the bus master device and the bus slave device to operate differently.

Figure 2A:
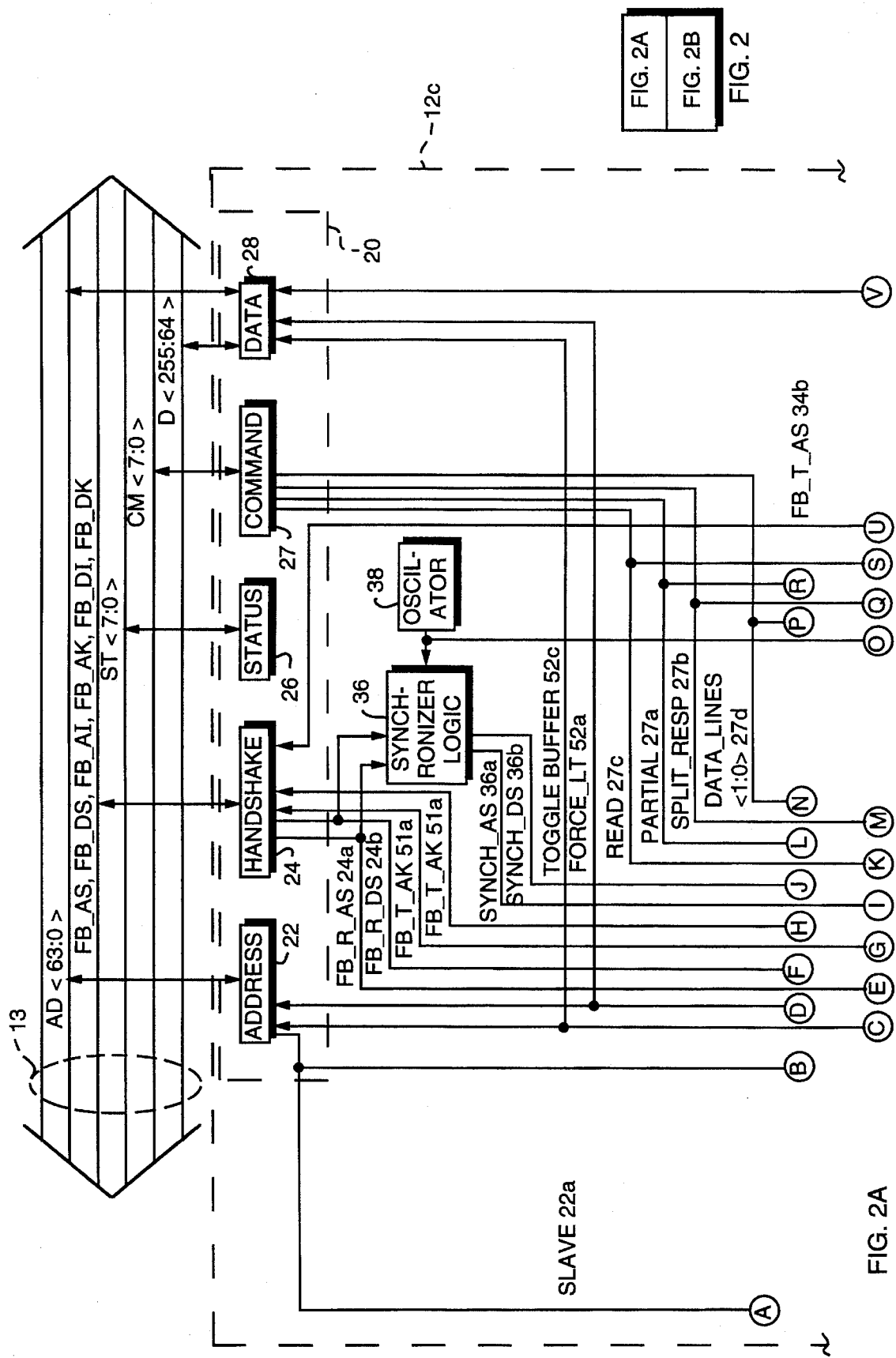
FIGS. 2a and 2b are a more detailed block diagram of the I/O device of FIG. 1.
Figure 2B:
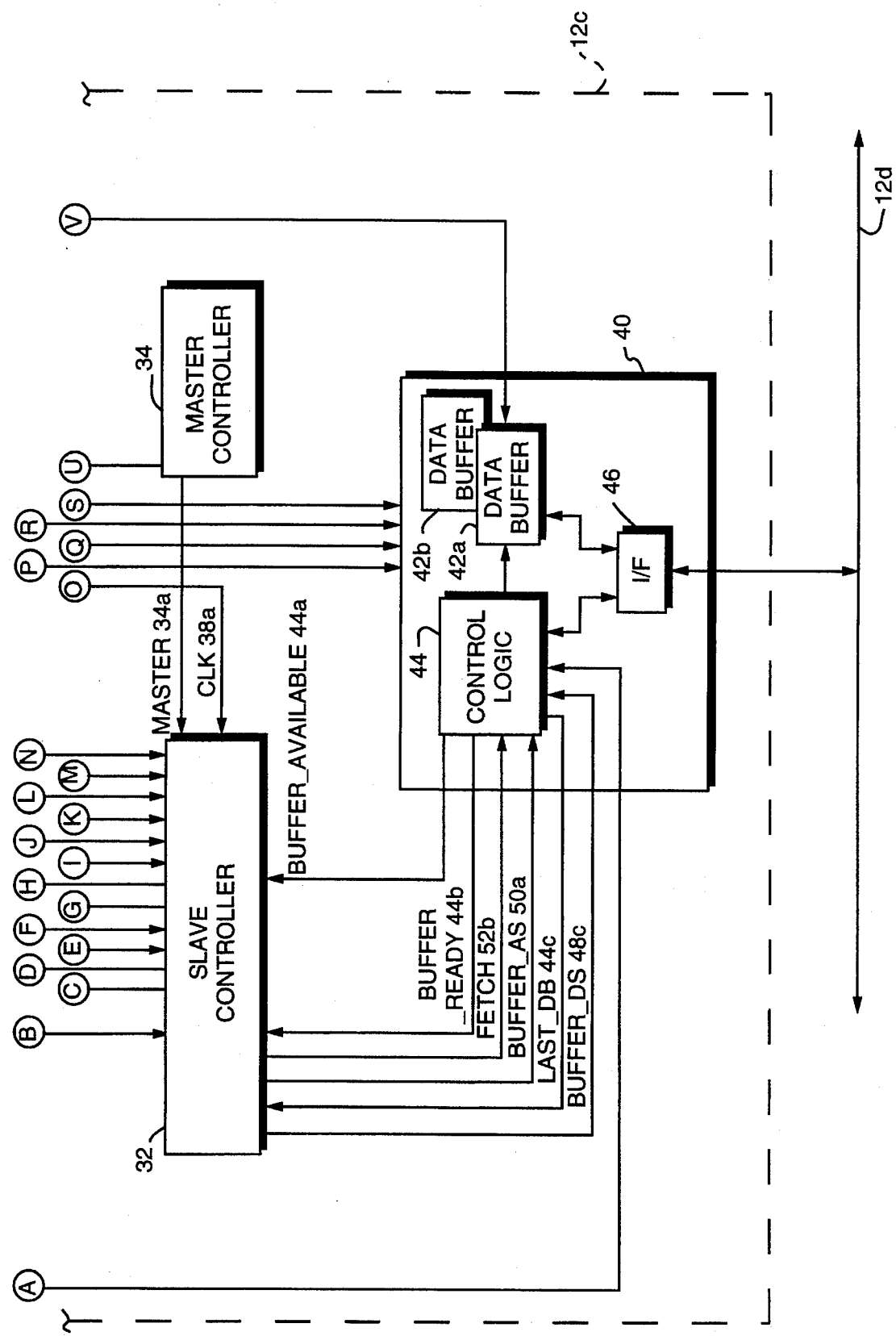

Referring now to FIG. 2, the I/O device 12c is coupled to the asynchronous I/O bus 13 through an asynchronous bus interface 20. The asynchronous bus interface 20 includes conventional interface circuits 22, 24, 26, 27, and 28 dedicated to the address 22 (AD<63:0>), handshake 24 (FB_AS, FB_DS, FB_AI, FB_AK, FB_DI, FB_DK), status 26 (ST<7:0>), command 27 (CM<7:0>), and data 28 (D<255:64>) signals on the asynchronous bus. This circuitry includes line terminations (not shown) for maintaining the appropriate signal integrity on the asynchronous bus by providing an appropriate matching impedance termination, and buffers (not shown) for providing appropriate voltage level translation between voltage levels of signals on the asynchronous bus and voltage levels of signals on the remainder of the I/O device 12c. The asynchronous bus interface 20 also includes transceivers (not shown) for sending and receiving data, and combinatorial logic (not shown) for decoding received signals or encoding signals to be sent.

The I/O device 12c further includes a slave controller 32 and a master controller 34 coupled to the asynchronous I/O bus 13 through the asynchronous bus interface 20. The I/O device 12c further includes synchronizer logic circuit 36 which is coupled between the controllers 32, 34 and the handshake circuitry 24 of the asynchronous bus interface 20. The synchronizer logic 36 includes conventional dual stage synchronizers (not shown), as previously discussed, for synchronizing each received signal. An oscillator 38 is also a part of the I/O device 12c and provides a CLK signal 38a to the synchronizer logic 36 and the slave controller 32. The CLK signal 38a may also be used by other components of the I/O device 12c (not shown), and instead of being supplied from oscillator 38, the CLK signal 38a may be provided by the system bus 12d, where the system bus 12d is a synchronous bus. The controllers 32, 34 receive asynchronous handshake signals directly from the handshake circuitry 24 and synchronized handshake signals from synchronizer logic 36. The slave controller 32 responds to transactions initiated by other devices resident on the asynchronous I/O bus 13, while the master controller 34 initiates transactions on the asynchronous I/O bus 13.

As shown in FIG. 2, both controllers 32, 34 are further coupled to a gate array 40. The gate array 40 includes combinatorial logic arranged to provide inter alia a bank of data buffers including data buffer 42a and data buffer 42b, control logic 44, and a system bus interface 46. There may be more than two data buffers in the bank of data buffers 42a, 42b, however, only two are shown in FIG. 2 for simplicity. Through the gate array 40, the controllers 32, 34 are coupled to the system bus 12d and may transfer data to and receive data from devices such as CPU 12a or main memory 12b resident on the system bus (FIG. 1).

Figure 3B:
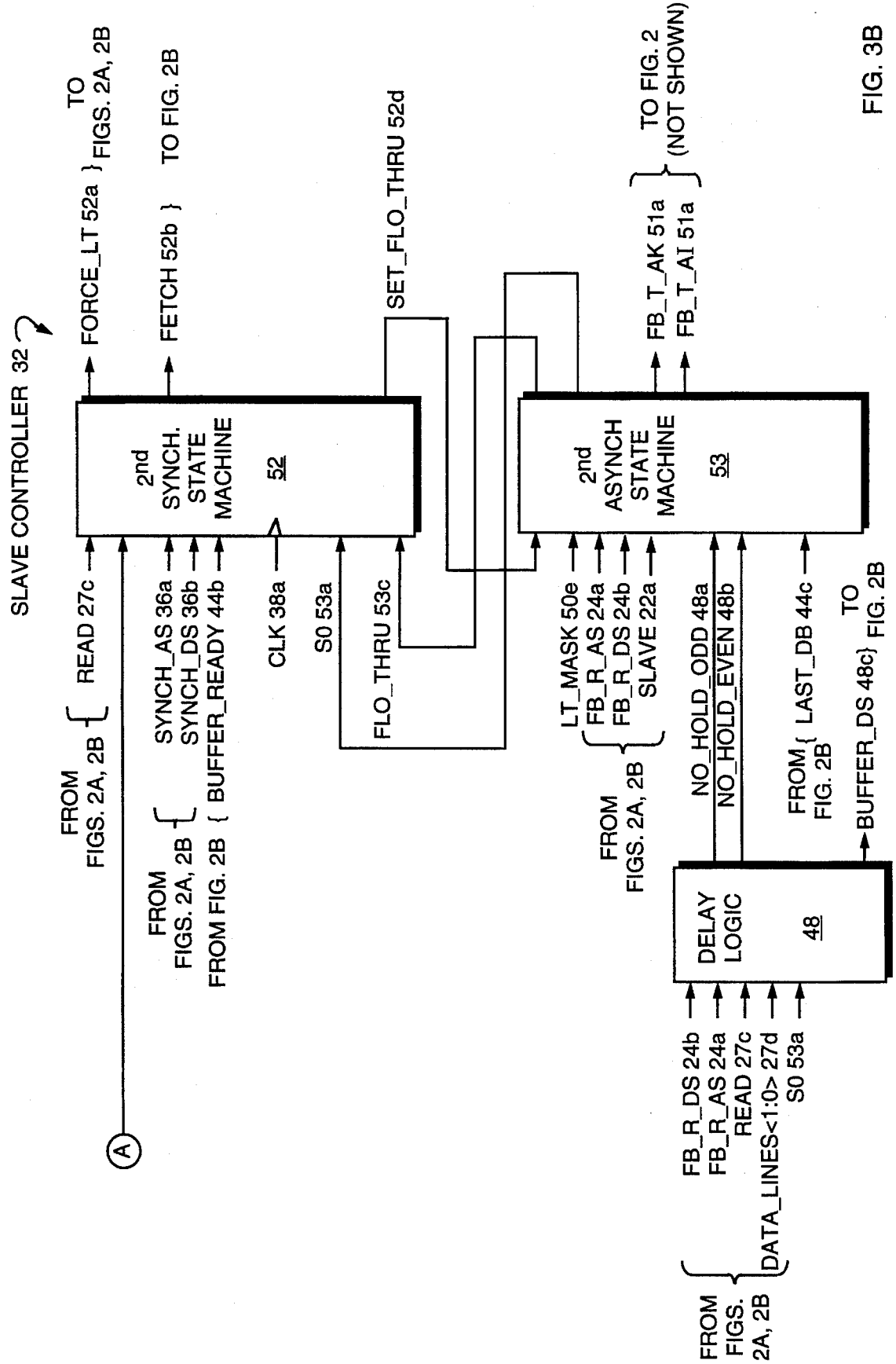

Referring now to FIG. 3, the slave controller 32 is shown to include here delay logic 48 and four state machines 50–53; a first synchronous state machine 50, a first asynchronous state machine 51, a second synchronous state machine 52, and a second asynchronous state machine 53. The delay logic 48 contains delay circuitry, including conventional delay elements and combinatorial logic. Through the delay logic 48, signals may be delayed by predetermined or varying periods of time. The state machines 50–53 are logic circuits which implement particular state equations. Often, programmable array logic (PAL) components are used as they are well suited for the implementation of state machines. Both synchronous state machines 50, 52 are synchronous to the CLK signal 38a and will change states when an appropriate state equation is true (combinatorial logic) and the CLK signal 38a transitions (flip-flop storage elements). As previously mentioned, the CLK signal 38a may come from the synchronous system bus and, therefore, the synchronous state machines 50, 52 would be synchronous to the system bus, or the CLK signal 38a may come from the oscillator 38. If the CLK signal comes from the oscillator 38, the period of the CLK signal may be chosen to be a derivative of the period of the system bus clock which allows the synchronous state machine 50, 52 to operate more efficiently than the period of the system bus clock signal. Both asynchronous state machines 51, 53 will change states (only one state bit will transition for each state change) when an appropriate state equation, including hazard terms, is true (combinatorial logic). These four state machines are used to respond to transactions initiated on the asynchronous I/O bus 13.

As shown in FIG. 3, the first synchronous state machine 50 receives a line carrying the CLK signal 38a and a line carrying a data buffer available signal 44a, i.e., BUFFER_AVAILABLE. The BUFFER_AVAILABLE signal 44a may be one signal or a set of data buffer status signals from the control logic 44 in gate array 40 (FIG. 2). The first synchronous state machine 50 also receives a line carrying a master signal 34a, i.e., MASTER, from the master controller 34 (FIG. 1), and lines carrying the synchronized address handshake signal 36a and the data handshake signal 36b, i.e., SYNCH_AS and SYNCH_DS, respectively, from the synchronizer logic 36 (FIG. 2). The asynchronous interface 20 handshake circuitry 24 sends received versions of asynchronous bus handshake signals to the synchronizer logic 36 (FIG.2). For example, the FB_AS and FB_DS signals from the asynchronous I/O bus are coupled to the handshake circuitry 24 which sends received versions of these signals 24a and 24b, i.e., FB_R_AS and FB_R_DS, respectively, to the synchronizer logic 36 (FIG. 2). The first synchronous state machine 50 also receives decode signals from the asynchronous bus interface 20 (FIG.2). The first synchronous state machine receives a decode line carrying a signal 22a from the address circuitry 22 indicating whether the I/O device 12c is a bus slave device, i.e., SLAVE. The first synchronous state machine also receives decode lines carrying signals 27a and 27b from the command circuitry 27 indicating the type of transaction, i.e., PARTIAL and SPLIT_RESP, respectively. The first synchronous state machine 50 uses these signals to determine when another device on the asynchronous I/O bus 13 (FIG. 1) is initiating a transaction.

Also, as shown in FIG. 3, the first synchronous state machine 50 provides a line carrying a data buffer address strobe signal 50a, i.e., BUFFER_AS, which is received by the control logic 44 in gate array 40 (FIG. 2). The first synchronous state machine 50 also provides a line carrying signal 50b, i.e., NO_CONN_HOLD, which is received by the first asynchronous state machine 51 and a line carrying signal 50c, i.e., GO, which is received by the second synchronous state machine 52. The first synchronous state machine 50 also provides lines carrying signals 50d and 50e, i.e., MBX_SEL and LT_MASK, respectively, necessary for certain transactions which will be described in more detail later. These signals allow the first synchronous state machine 50 to hold off the first asynchronous state machine 51 until the address and command information provided by the bus master device has been captured and decoded to determine whether the I/O device is a bus slave device and whether there are any errors, such that the I/O device may provide the appropriate connection phase status on the ST<7:0> lines of the asynchronous bus. The first synchronous state machine 50 also holds off the second synchronous state machine 52 until the type of transaction has been determined and thus, the first synchronous state machine asserts the GO signal 50c.

The BUFFER_AVAILABLE signal 44a from the control logic 44 in the gate array 40 indicates that a data buffer in the bank of data buffers 42a, 42b of the gate array 40 (FIG. 2) is available. Alternatively, the slave controller 32 could keep track of the number of data buffers and their availability with additional circuitry (not shown) using additional other signals (not shown) from the gate array. This example locates this buffer availability circuitry in the gate array, and thus, centralizes the circuitry for both the master and slave controllers 32, 34, respectively. The large amount of circuitry available in a gate array may allow for more flexibility. For example, the circuitry in the gate array may be able to provide more easily for dynamically changing the size of the data buffers, etc. The term "available" as used here indicates that a data buffer is empty so that it may accept data from the asynchronous I/O bus in the case of an asynchronous I/O bus write received from a bus master device or that it may accept data from the synchronous system bus in the case of an asynchronous I/O bus read received from a bus master device.

The MASTER signal 34a is asserted by the master controller 34 when the master controller is initiating a transaction on the asynchronous I/O bus 13 (FIGS. 1 and 2). The SYNCH_AS signal 36a and SYNCH_DS signal 36b are synchronized versions of the received asynchronous I/O bus address and data handshake signals 24a and 24b, i.e., FB_R_AS and FB_R_DS, respectively. The SLAVE signal 22a indicates whether the I/O device 12c (FIG. 1) is a bus slave device, and the PARTIAL signal 27a and SPLIT_RESP signal 27b indicate what type of transaction has been initiated.

The BUFFER_AS signal 50a may be asserted by the first synchronous state machine 50 to cause control logic 44 in gate array 40 (FIG. 2) to use the address and command signals which were captured by the asynchronous bus interface 20 address circuitry 22 and command circuitry 27 (FIG. 2). In the case of a write, the address and command is used by the gate array control logic to store data received from the bus master device in the bank of data buffers 42a, 42b of the gate array, and then the control logic uses the address to transfer the data from the bank of data buffers to the main memory 12b on the system bus 12d (FIG. 1). In the case of a read, the address information is used by the gate array control logic to transfer the necessary data from the main memory on the system bus to the bank of data buffers of the gate array, and then the control logic uses the address and command information to transfer the data from the bank of data buffers to the asynchronous I/O bus.

The assertion of the NO_CONN_HOLD signal 50b indicates to the first asynchronous state machine 51 that another device on the asynchronous I/O bus is initiating a transaction, that the address and command information on the asynchronous I/O bus has been captured and at least partially decoded such that the appropriate connection phase status has been placed on the ST<7:0> lines of the asynchronous I/O bus, and that a data buffer in the bank of data buffers 42a, 42b of the gate array is available for the transaction.

Figure 4:
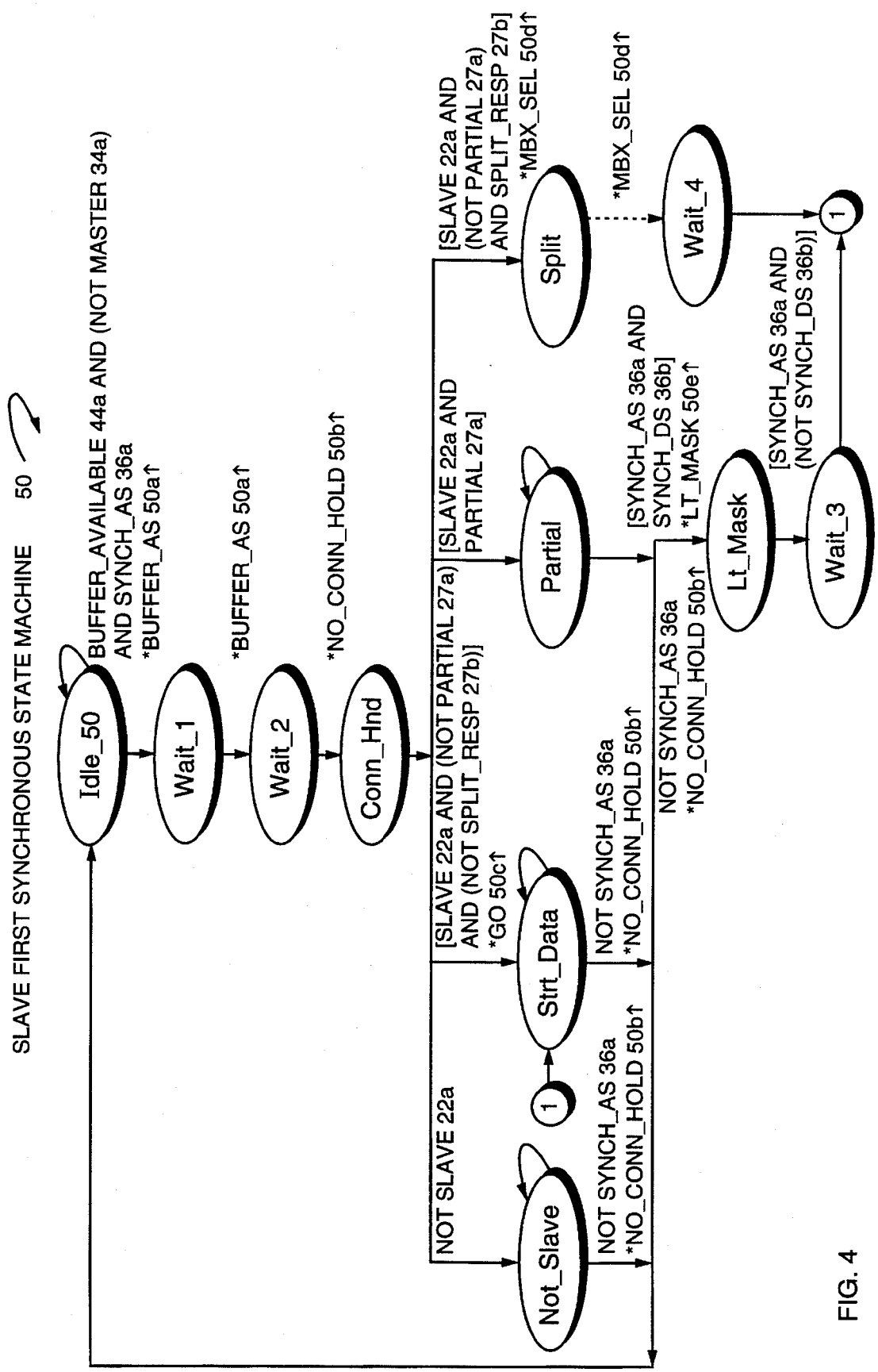
FIG. 4 is a state diagram illustrating the flow of the first synchronous state machine of FIGS. 3a, 3b.
Figure 8:
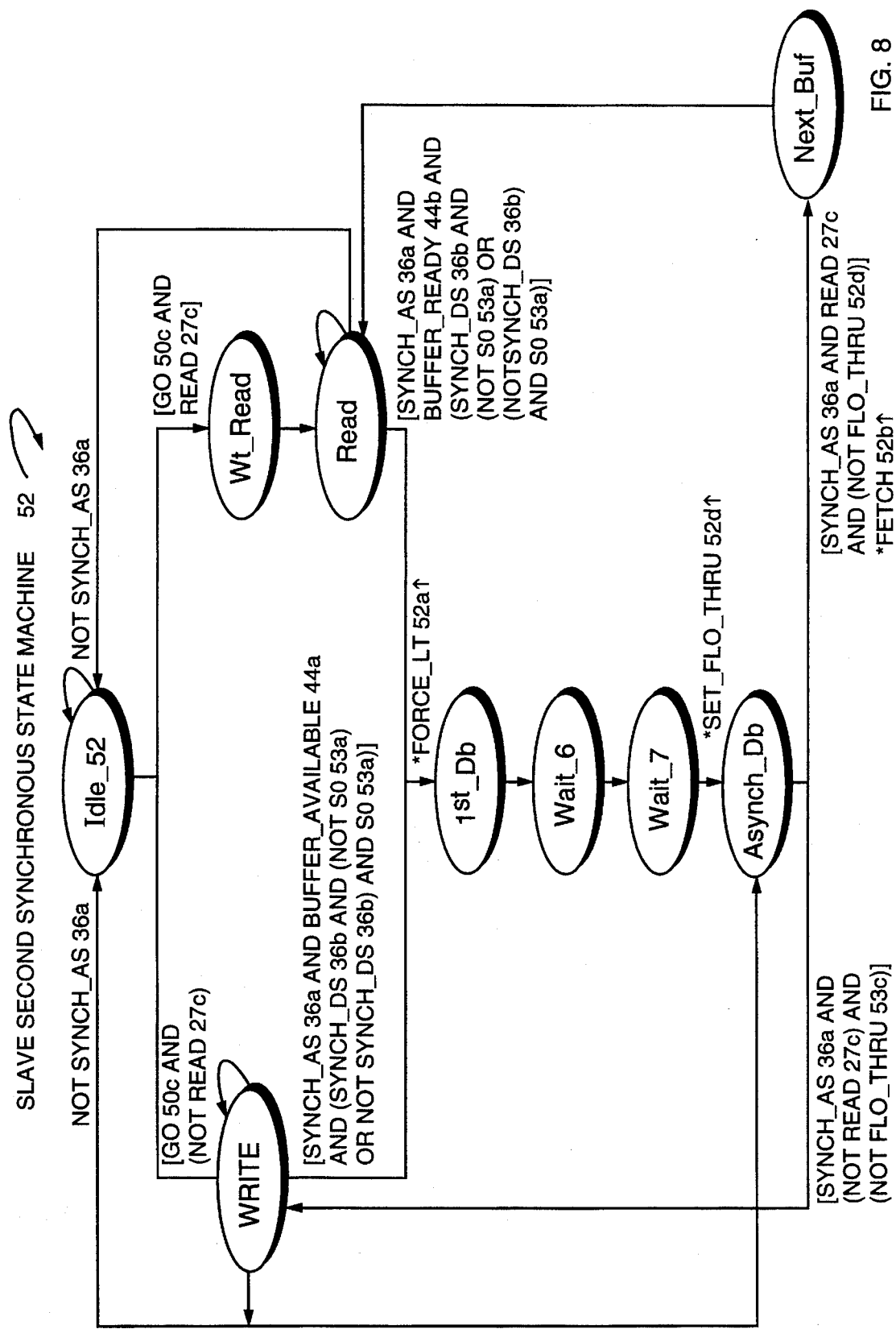
FIG. 8 is a state diagram illustrating the flow of the second synchronous state machine of FIGS. 3a, 3b.
Figure 9:
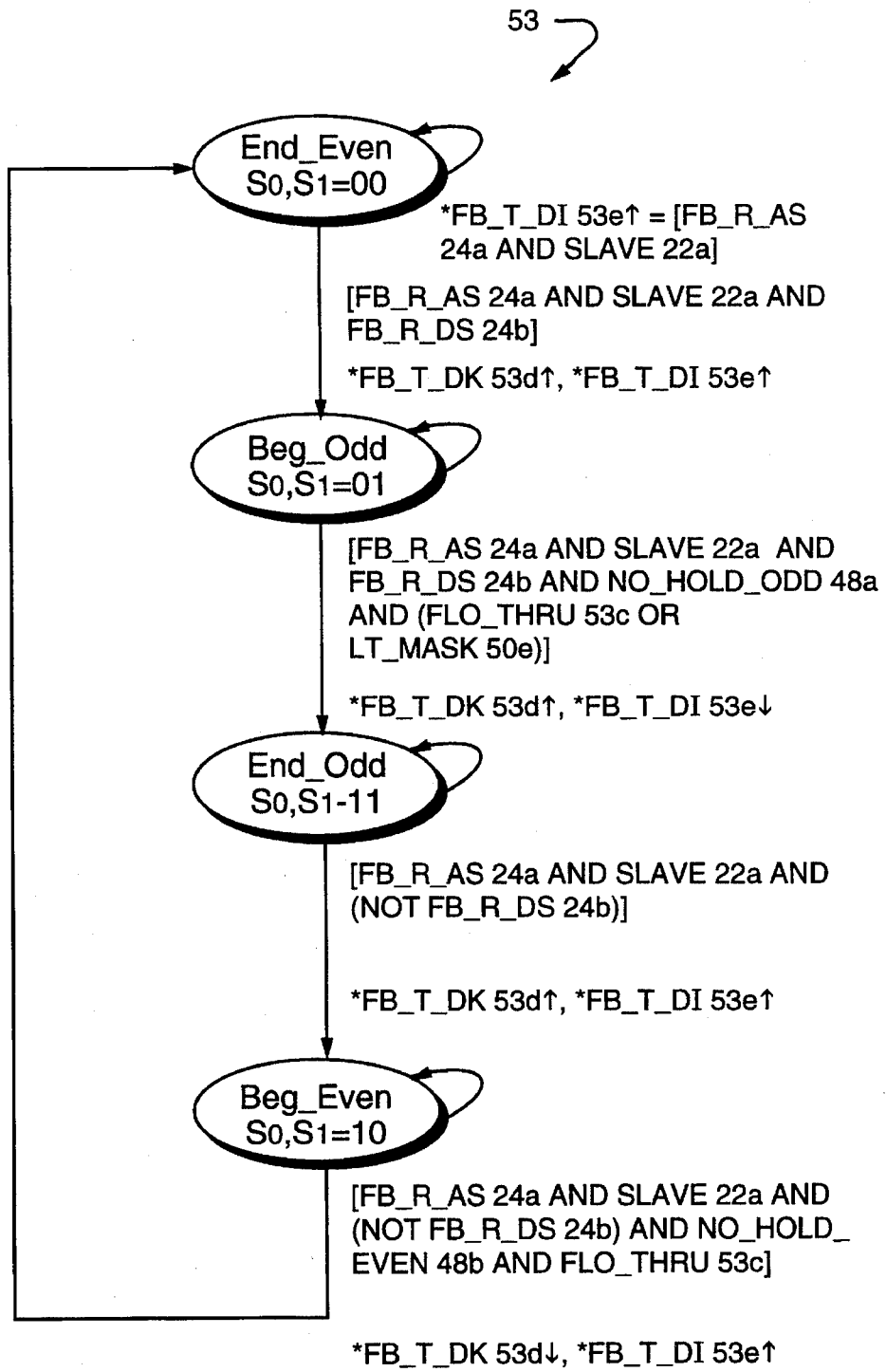
FIG. 9 is a state diagram illustrating the flow of the second asynchronous state machine of FIGS. 3a, 3b.

In the state diagrams of FIGS. 4, 8, and 9, ovals represent states and arrows leading into and out of ovals represent paths that may be taken by the state machine from one state to another. An arrow leading out of an oval and back into the same oval indicates a looping condition where the state machine remains in that state until a state equation becomes true which allows the state machine to transition to a next state. Asterisks (*) to the left of signals which are adjacent arrows leading from one oval into another oval indicate that these are output signals of the state machine. Up and down arrows to the right of output signals represent the assertion or deassertion, respectively, of the state machine output signal when the state machine transitions from one oval to another oval. The synchronous state machines 50 and 52 are here implemented using conventional D-type flip-flops, and, therefore, output signals of the state machine which are shown asserted upon entry into one state will automatically deassert if not shown asserted in the next state. Equations adjacent arrows leading from one oval into another oval represent at least a portion of the state equation required to be met in order to enter the oval, i.e., state, into which the arrow leads. Both asynchronous state machines 51 and 53 may further include hazard terms in their state equations which have not been included in the state diagrams for simplicity. Within the state equations, AND represents the basic boolean algebra "and" function, OR represents the basic boolean algebra "or" function, and NOT represents the basic boolean algebra complement function. An arrow leading from an oval into a circle with a number inside corresponds to at least one other circle with the same number inside having an arrow leading into another oval. These circles with the same number inside represent connections as if each oval having an arrow leading into a circle with a number inside had an arrow leading directly into the oval which receives an arrow from a circle containing the same number. The state diagrams use these circles to simplify the drawings.

Referring now to FIG. 4, a state diagram illustrating the operation of the first synchronous state machine 51 of FIG. 3 is shown. The first synchronous state machine 51 begins in an Idle_50 state and transitions to a Wait_1 state when the state equation: BUFFER_AVAILABLE 44a AND (NOT MASTER 34a) AND SYNCH_AS 36a, becomes valid, (i.e., the BUFFER_AVAILABLE signal 44a and SYNCH_AS signal 36a are asserted and the MASTER signal 34a is deasserted). These signals indicate that a transaction has been initiated on the asynchronous I/O bus, that the I/O device is not initiating the transaction, and that a data buffer in the bank of data buffers 42a, 42b of the gate array 40 (FIG. 2) is available.

If this first state equation is valid, the state machine transitions to the Wait_1 state on the next transition of the CLK signal 38a, and asserts the BUFFER_AS signal 50a. There is no state equation for the Wait 1 state, and, therefore, on the next transition of the CLK signal 38a, the state machine will automatically transition to a Wait_2 state. The state machine will similarly remain in the Wait_2 state for one transition of the CLK signal and continue to assert the BUFFER_AS signal 50a. The states Wait_1 and Wait_2 are termed "wait" states, as they are used to add clock cycle delays into the operation of the state machine. The number of wait states can vary depending on particular characteristics of the bus and interface apparatus coupled to the bus. The number of wait states is chosen in this instance to be greater than or equal to the period of time necessary for the asynchronous bus interface 20 address circuitry 22 and command circuitry 27 (FIG. 2) to capture and at least partially decode the address and command signals received from the asynchronous I/O bus such that the error circuitry (not shown) may determine if an error has occurred and the address circuitry 22 may determine whether the I/O device is a bus slave device. The period of time is sufficient to allow the I/O device to determine the necessary status information and place the status information on the ST<7:0> lines, and for the control logic 44 in gate array 40 (FIG. 2) to use the address information.

From the Wait_2 state, the first synchronous state machine 50 transitions to a Conn_Hnd state where it asserts the NO_CONN_HOLD signal 50b to the first asynchronous state machine 51 (FIG. 3). The assertion of the NO_CONN_HOLD signal 50b allows the first asynchronous state machine 51 to respond on the asynchronous I/O bus with the connection phase handshake signals, which will be described in more detail later. The first synchronous state machine 50 then examines the SLAVE signal 22a, the PARTIAL signal 27a, and the SPLIT_RESP signal 27b. The PARTIAL signal 27a and the SPLIT_RESP signal 27b indicate two types of transactions which will be described in more detail later. The SLAVE signal 22a indicates that the I/O device is a target of the current transaction. If the SLAVE signal 22a is deasserted, i.e., NOT SLAVE 22a, then the I/O device is not the target of the transaction, and a Not_Slave state is entered. The state machine remains in the Not_Slave state until the transaction is finished, signified by the deassertion of the SYNCH_AS signal 36a. When the SYNCH_AS signal 36a deasserts, the first synchronous state machine 50 enters the Idle_50 state and asserts the NO_CONN_HOLD signal 50b to the first asynchronous state machine 51, to allow the first asynchronous state machine 51 to handle the disconnection phase handshake signals which will be described in more detail later.

If the SLAVE signal 22a is asserted and the PARTIAL signal 27a and the SPLIT_RESP signal 27b are deasserted, i.e., SLAVE 22a AND (NOT PARTIAL 27a) AND (NOT SPLIT_RESP 27b), the transaction is a simple data transfer. Therefore, the first synchronous state machine 50 transitions to a Strt_Data state and asserts the GO signal 50c to the second synchronous state machine 52 to begin the data transfer phase, to be described in more detail later. The first synchronous state machine 50 then remains in the Strt_Data state until the transaction is ended which is indicated by the deassertion of the SYNCH_AS signal 36a. Upon the deassertion of the SYNCH_AS signal 36a, the state machine returns to the Idle_50 state to wait for the initiation of another transaction and asserts the NO_CONN_HOLD signal 50b.

If necessary, the first synchronous state machine 50 could add wait states to delay the assertion of the NO_CONN_HOLD signal 50b following the deassertion of the SYNCH_AS signal 36a. For example, a bus slave device which is splitting a transaction (to be described in more detail later) must capture the bus master device's disconnection identification in the disconnection phase which the bus master device places on the data lines. The bus slave device may need additional time to capture this information than is required in the disconnection phase of a completed transaction, and the first synchronous state machine 50 could provide the additional time by adding wait states following the deassertion of the SYNCH_AS signal 36a. An additional path in the first synchronous state machine 50 could be added to handle this situation so that other transactions are not unnecessarily delayed.

During the operation of the first synchronous state machine 50, the assertion of the PARTIAL signal 27a indicates that out of the available lines chosen for data transfer, i.e., the AD<31:0> lines and possibly the AD<63:32>, D<255:128>, and D<127:64> lines, only certain groups of eight lines, for example, AD<7:0> and AD<31:24> from AD<31:0>, will contain valid data. The first data transfer in a partial transaction contains data which are used as a data transfer mask. The mask is saved in circuitry, such as a register (not shown), and used during the transaction for subsequent data transfers. The mask is thirty-two bits wide with each bit corresponding to a group of eight lines (a byte of data). For example, mask bit zero corresponds to lines AD<7:0>, while mask bit thirty-one corresponds to lines D<255:248>. A convention is established to indicate when a particular group of lines, i.e., AD<7:0> . . . D<255:248>, contain a valid byte of data. The convention used here is that if mask bit zero is a logic level one, "1", the corresponding lines, i.e., AD<7:0>, will contain valid data. If mask bit zero is a logic level zero, "0", the data is not valid.

The assertion of the SPLIT_RESP signal 27b indicates that the bus master device is initiating a split response transaction. A split response transaction is one in which the current bus master device, is responding to an earlier transaction which was initiated by another device, i.e., the original bus master device, now the current bus slave device. For example, an original bus slave device may determine that a considerable amount of time is required to retrieve data necessary to service a read request by an original bus master device. In such a case, the original bus slave device may split, i.e., end, the transaction before the data transfer phase such that other devices on the asynchronous I/O bus may conduct transactions while the original bus slave device retrieves the requested data. When the original bus slave device has retrieved the requested data, it may continue the transaction by initiating, i.e., becoming the bus master device, a split response transaction, and sending the requested data to a current bus slave device, i.e., the original bus master device.

Both a partial and a split response transaction require additional actions to those required for a simple read or write. The state machine handles these additional actions through additional states. In the first synchronous state machine, if the PARTIAL signal 27a and the SLAVE signal 22a are asserted, i.e., SLAVE 22a AND PARTIAL 27a, during the Conn_Hnd state, the state machine proceeds to a Partial state and waits for the assertion of the SYNCH_DS signal 36b from the synchronizer logic 28 (FIG. 2). If the SYNCH_AS signal 36a deasserts while in the Partial state, i.e., NOT SYNCH_AS, before the assertion of the SYNCH_DS signal 36b, then the transaction has ended, and the state machine asserts the NO_CONN_HOLD signal 50b and enters the Idle_50 state to wait for the initiation of another transaction on the asynchronous I/O bus. However, upon the assertion of the SYNCH_DS signal 36b while the state machine is in the Partial state, the first synchronous state machine 50 transitions to a Lt_Mask state and asserts the LT_MASK signal 50e. The LT_MASK signal 50e causes the byte mask register circuitry (not shown) to latch the byte mask data. The LT_MASK signal 50e is also sent to the second asynchronous state machine 53 to enable the second asynchronous state machine 53 to respond on the asynchronous I/O bus with the appropriate data phase handshake signals, to be described in more detail later. When the state equation: SYNCH_AS 36a and (NOT SYNCH_DS 36b), becomes valid, the state machine then transitions to a Wait_3 state. Several wait states may be added between the Lt_Mask state and the Wait_3 state in order to set up the circuitry required to accomplish a partial transaction. When the circuitry is ready and the mask data has been captured, the first synchronous state machine 50 transitions to the Strt_Data state and asserts the GO signal 50c.

In the first synchronous state machine 50, if the SPLIT_RESP signal 27b and the SLAVE signal 22a are asserted and the PARTIAL signal 27a is deasserted, i.e., SLAVE 22a AND (NOT PARTIAL 27a) AND SPLIT_RESP 27b, during the Conn Hnd state, the state machine proceeds to a Split state and asserts the MBX_SEL signal 50d. The MBX_SEL signal 50d is used by circuitry (not shown) to resume the processing of a previously split transaction. Any number of wait states, i.e., Wait_4 state, may be added to allow sufficient time to prepare such circuitry. When the circuitry is prepared to respond to the split response transaction, the first synchronous state machine 50 transitions to the Strt Data state and asserts the GO signal 50c.

The above outlined state machine includes some of the many determinations that need to be made when the I/O device 12c (FIG. 1) is a bus slave device. There can be many other determinations which are made in the connection phase of a transaction, such as determinations depending upon the characteristics of the I/O device 12c, the bus master device, and the asynchronous I/O bus 13. For example, the I/O device 12c may initiate a split transaction as described above.

Implementing the protocol of the connection phase as the first synchronous state machine 50 provides a slower state machine than if the protocol were implemented as a corresponding asynchronous state machine due to the necessity of synchronizing the FB_R_AS signal 24a, i.e., the SYNCH_AS signal 36a, and the FB_R_DS signal 24b, i.e., the SYNCH_DS signal 36b, (FIG. 2) as previously discussed. The first synchronous state machine 50 may also be slower than a corresponding asynchronous state machine, because the synchronous state machine will not change state until the appropriate state equation is true and the CLK signal 38a transitions, whereas a corresponding asynchronous state machine will change state as soon as the appropriate state equation becomes true.

However, an I/O device used to interface to an asynchronous bus implementing a flexible protocol which allows a large number of different devices to operate optimally, such as the FBUS, requires that I/O device to make many determinations, including whether the I/O device is a bus slave device, what type of transaction has been initiated, and how that transaction is to be handled. After these many determinations are made, the I/O device may need to respond in correspondingly different ways. These different responses may be handled by different paths in a state machine of the I/O device. As mentioned previously, asynchronous state machines allow only one state bit to change per state transition. Therefore, synchronous state machines such as the first synchronous state machine 50 are generally better suited than asynchronous state machines for implementing different paths from one state into many other states due in part to the fact that synchronous state machines are not limited to allowing only one state bit to change per state transition. Further, a synchronous state machine also allows wait states to be easily added, i.e., no additional circuitry, to the many paths that may be required of the state machine to allow sufficient time for specific circuitry to be set up or for signals to propagate through specific circuitry.

For an asynchronous state machine to add a wait state additional circuitry would need to be added, for example, delay logic to delay a previous signal. Also, as the number of states increases in an asynchronous state machine, the number of state bits significantly increase due to the necessity of allowing only one state bit to change per state transition (a corresponding synchronous state machine may require less state bits). The number of hazard terms required for an asynchronous state machine will also increase as the number of state bits and input signals increase. If the protocol of the connection phase is implemented as a corresponding asynchronous state machine, the corresponding asynchronous state machine would, in general, be very large requiring significantly more circuitry than the first synchronous state machine 50 due to the requirement of having only one state bit change per state transition and also due to the necessity of including hazard terms in the state equations, as previously discussed.

Moreover, if such an asynchronous state machine was implemented in fast programmable logic array (PAL) devices, the transition of the state machine from one state to another might be slower than the propagation delay of a single PAL due to the amount of circuitry required to build the asynchronous state machine. One or more PALs might have to be stacked in order to implement the state equations of the asynchronous state machine. The term "stacked" is used herein to indicate an arrangement where a first PAL sends one or more signals to a second PAL which then sends one or more signals back to the first PAL or to other PALs which in turn eventually send signals to the first PAL. Each time a PAL is stacked to implement a state equation, a PAL delay is added to the transition time for the corresponding state. Thus, implementing the protocol of the connection phase as an asynchronous state machine would require the use of a large number of logic circuits, and if the asynchronous state machine is implemented through PAL devices, it may be necessary to stack PALS which would slow the asynchronous state machine down, thereby, at least partially negating the presumed speed advantage of the asynchronous state machine over the first synchronous state machine 50.

Referring again to FIG. 3, as mentioned previously, the first asynchronous state machine 51 receives a line carrying the NO_CONN_HOLD signal 50b from the first synchronous state machine 50. The first asynchronous state machine 51 also receives a line carrying the FB_R_AS signal 24a from the asynchronous bus interface 20 address circuitry 22 (FIG. 2). The FB_R_AS signal 24a is a received version of the FB_AS signal on the asynchronous I/O bus as opposed to the transmitted version, i.e., FB_T_AS 34b, which is asserted by the master controller 34 (FIG. 2) when the I/O device 12c is the bus master device. The first asynchronous state machine 51 provides a line carrying a signal 51a, i.e., FB_T_AK, which is the transmit version of the asynchronous address acknowledge signal, i.e., FB_AK, on the asynchronous I/O bus. The first asynchronous state machine 51 further provides a line carrying a signal 51b, i.e., FB_T_AI, which is the transmit version of the asynchronous address acknowledge inverse signal, i.e., FB_AI. Both the FB_T_AK signal 51a and the FB_T_AI signal 51b are sent to the asynchronous bus interface 20 handshake circuitry 22 for transmission on the asynchronous I/O bus as the FB_AI signal and the FB_AK signal respectively.

Figure 5:
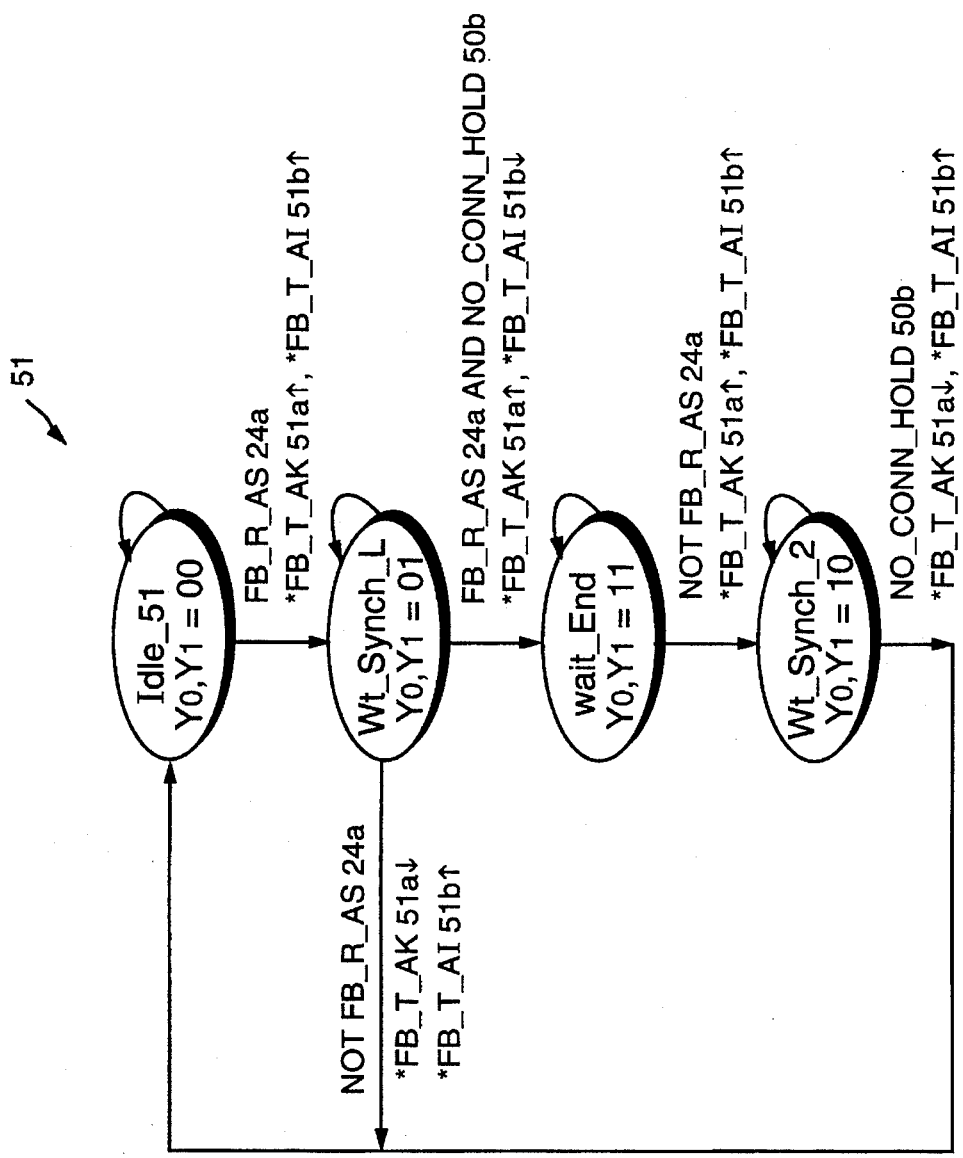
FIG. 5 is a state diagram illustrating the flow of the first asynchronous state machine of FIGS. 3a, 3b.

Referring now to FIG. 5, a state diagram illustrating the operation of the first asynchronous state machine 51 of FIG. 3 is shown. The first asynchronous state machine 51 begins in an Idle_51 state with the FB_T_AK signal 51a deasserted and the FB_T_AI signal 51b asserted. The state machine enters the Idle_51 state when the NO_CONN_HOLD signal 50b is deasserted from a previous transaction and transitions to a Wt_Sync_1 state when the FB_R_AS signal 24a is asserted indicating a new transaction. The first asynchronous state machine 51 waits in the Wt_Sync_1 state until the first synchronous state machine 50 asserts the NO_CONN_HOLD signal 50b. Upon detecting the assertion of the NO_CONN_HOLD signal 50b, the first asynchronous state machine 51 transitions to a Wait_End state and completes the connection phase handshake signals on the asynchronous bus by asserting the FB_T_AK signal 51a while continuing to assert the FB_T_AI signal 51b. As described above, the first synchronous state machine 50 asserts the NO_CONN_HOLD signal 50b after the address and command information provided on the asynchronous I/O bus 13 (FIG. 1) has been captured and the appropriate connection phase status has been placed on the ST<7:0> lines of the asynchronous I/O bus. Thus, although the first asynchronous state machine 51 receives the assertion of the FB_R_AS signal 24a prior to the first synchronous state machine 50 receiving the assertion of the related signal, SYNCH_AS signal 36a, the first asynchronous state machine 51 is held off, i.e., unable to enter the Wait_End state and complete the connection phase protocol, through the use of the NO_CONN_HOLD signal 50b until the address and command information provided on the asynchronous I/O bus has been captured and at least partially decoded by the first synchronous state machine 50.

The first asynchronous state machine 51 will remain in the Wait_End state until the asynchronous I/O bus transaction is ended which is signified by the deassertion of the FB_R_AS signal 24a. The state machine will then transition to a Wt_Sync_2 state and assert the FB_T_AI signal 51b while continuing to assert the FB_T_AK signal 51a. Following the assertion of the NO_CONN_HOLD signal 50b by the first synchronous state machine 50, while the first asynchronous state machine 51 is in Wt_Sync_2 state, the first asynchronous state machine transitions to the Idle_51 state to wait for another asynchronous I/O bus transaction and deasserts the FB_T_AK signal 51a while continuing to assert the FB_T_AI signal 51b. As described above, the first synchronous state machine 50 asserts the NO_CONN_HOLD signal 50b after capturing disconnection phase data sent by the bus master device on the data lines if necessary and after placing status on the ST<7:0> lines.

Here the first asynchronous state machine 51 is a simple state machine comprised of four states. Therefore, the requirement of having only one state bit change per state transition does not effect the number of state bits necessary to implement the asynchronous state machine. For example, the states of the first asynchronous state machine 51 may be represented by two state bits, i.e., Y0 and Y1. The state bits Y0, Y1 may be used internally by the circuitry of the state machine or the logic levels of the bits may be carried on output lines of the state machine (not shown) to be used by other circuitry. By permitting only one bit to change per state transition by using so called "Gray" coding, the state bits Y0, Y1 for the Idle_51 state may equal "00", i.e., 0 represents a deasserted state bit while 1 represents an asserted state bit, and the Wt_Sync_1, Wait_End, and Wt_Sync_2 states may be represented by the state bits Y0, Y1 equaling, "01", "11", and "10", respectively. No additional state bits are required to implement the four states of the first asynchronous state machine while still only permitting one state bit to change per state transition.

Referring now to FIG. 6, a truth table is shown which corresponds to the first asynchronous state machine 51 of FIGS. 3 and 5. A "0" or a "1" in the truth table of FIG. 6 represents a deasserted or an asserted bit, respectively. An "X" in the truth table represents a "don't care" bit, i.e., that bit is irrelevant with respect to the outputs of the state machine. The first and second columns represent the current assertion levels of the state bits Y0 and Y1 of the state machine. For example, Y0, Y1 equal to "00" represents that the first asynchronous state machine is currently in the Idle_51 state, "01" represents the Wt_Sync_1 state, "11" represents the Wait_End state, and "10" represents the Wt_Sync_2 state (FIG. 5). The third column of the truth table represents the assertion level of the FB_R_AS signal 24a, and the fourth column represents the assertion level of the NO_CONN_HOLD signal 50b. The fifth and sixth columns of the truth table represent the next state assertion levels, i e , Y0' and Y1', of the state bits Y0 and Y1 of the state machine. The seventh column represents the assertion level of the first asynchronous state machine 51 output signal FB_T_AK 51a, and the eighth column represents the assertion level of the output signal FB_T_AI 51b.

The next state bits Y0' and Y1' (columns five and six) and the state machine output signals FB_T_AK 51a and FB_T_AI 51b (columns seven and eight) are determined from the current state bits Y0 and Y1 (columns one and two) and the state machine input signals FB_R_AS 24a and NO_CONN_HOLD 50b (columns three and four) according to the state diagram shown in FIG. 5. For example, the second row of the truth table of FIG. 6 shows that the current state is the Idle_51 state, i.e., state bits Y0 and Y1 equal "00" the FB_R_AS signal 24a is deasserted, and the NO_CONN_HOLD signal 50b is irrelevant, i.e., "X". The state diagram shown in FIG. 5 indicates that given these conditions, the first asynchronous state machine 51 will transition to the Wt_Sync_1 state, i.e., represented by Y0' and Y1' in the fifth and sixth columns, row 2 equal to "01" and assert the FB_T_AK signal 51a and the FB_T_AI signal 51b, shown in columns seven and eight, row two as "11".

Referring now to FIG. 7, a Karnaugh map is shown which illustrates the conditions under which the first asynchronous state machine 51 output signal FB_T_AK 51a will be asserted according to the truth table of FIG. 6. A "1" in the Karnaugh map represents a condition when the FB_T_AK signal 51a will be asserted, whereas, a "0" represents when the FB_T_AK signal 51a will not be asserted. Through the Karnaugh map, the equation for the FB_T_AK signal 51a can be determined. For a corresponding synchronous state machine, the equation, after term reduction, would be: [{(NOT Y0) AND FB_R_AS 24a} OR {Y0 AND Y1} OR {Y0 AND (NOT FB_R_AS 24a) AND NOT NO_CONN_HOLD 50b}]. The three terms of this equation separated by the "OR" function, are shown through the three groupings of "1"s bounded by solid lines in the Karnaugh map of FIG. 7. However, it is necessary to add the hazard term: OR {Y1 AND FB_R_AS 24a}, shown through the grouping of "1"s bounded by dashed lines in the Karnaugh map of FIG. 7, for the first asynchronous state machine 51. As previously mentioned, the addition of hazard terms to the output equations and state equations of asynchronous state machines prevents a glitch on a state machine input signal or state bit from causing the asynchronous state machine to enter an incorrect state. Similar Karnaugh maps for the generation of equations, including hazard terms, for the state machine output signal FB_T_AI 51b and for the first asynchronous state machine 51 state bits Y0 and Y1 can be produced from the truth table of FIG. 6.

A corresponding synchronous state machine designed to operate in the same way as the first asynchronous state machine 51 would require less circuitry only in that the hazard term would not be required. However, synchronous state machines are only permitted to change state when the state equation is true and the CLK signal 38a transitions. On the other hand, the first asynchronous state machine 51 will respond immediately, i.e., as soon as the delay through the circuitry of the state machine permits, to the assertion of the FB_R_AS signal 24a by asserting the FB_T_AK signal 51a and will also respond immediately to the assertion of the NO_CONN_HOLD signal 50b by either deasserting the FB_T_AI signal 51b or deasserting the FB_T_AK signal 51a. Accordingly, the first asynchronous state machine 51 is significantly faster than a corresponding synchronous state machine, because the asynchronous state machine will transition to a next state as soon as the state equation becomes true.

The first asynchronous state machine 51 is used here to provide the connection phase handshake signals in response to only a few input signals. The many determinations required during the connection phase are accomplished by the first synchronous state machine 50 which then allows the first asynchronous state machine 51 to quickly respond with the connection phase handshake signals once the determinations are complete. The savings achieved by the small increase in circuitry required to implement the state machine 51 asynchronously is here not enough to justify the loss in speed which would be experienced in using a synchronous state machine.

Referring again to FIG. 3, in addition to the GO signal 50c from the first synchronous state machine 50, the second synchronous state machine 52 receives a line carrying signal 27c, i.e., READ, from the asynchronous interface 20 command circuitry 27 (FIG. 2). The READ signal 27c is a command decode signal which when asserted, indicates that the bus master device is requesting a read transaction and when deasserted, indicates that the bus master device is requesting a write transaction. The second synchronous state machine 52 further receives lines carrying the SYNCH_AS signal 36a and the SYNCH_DS signal 36b and lines from the second asynchronous state machine 53 carrying a state bit signal 53a, i.e., S0, and a signal 53c, i.e., FLO_THRU. The second synchronous state machine 52 also receives the CLK signal 38a, as previously mentioned.

Additionally, the second synchronous state machine 52 receives a line carrying a buffer ready signal 44b, i.e., BUFFER_READY, from the control logic 44 in gate array 40 (FIG. 2). Similar to the BUFFER_AVAILABLE signal 44a sent by the control logic 44 to the first synchronous state machine 50, the buffer ready circuitry which generates the BUFFER_READY signal 44b could be located in the slave controller 32 (FIG. 2) and additional signals sent from the gate array to the slave controller. Again, in this example, the buffer ready circuitry (not shown) is located in the control logic 44 of the gate array 40 to allow for a centralized location of the circuitry and provide the flexibility that the large amount of circuitry available in the gate array provides. The BUFFER_READY signal 44b is used to indicate that a data buffer in the bank of data buffers 42a, 42b in gate array 40 is ready. The term "ready" as used herein indicates that a data buffer contains data retrieved from the main memory to be sent to the asynchronous I/O bus in the case of a bus master device initiated read.

The second synchronous state machine 52 provides several lines carrying signals, including the FORCE_LT signal 52a which is used to control the asynchronous interface 20 address circuitry 22 and data circuitry 28 (FIG. 2). The FORCE_LT signal 52a may be one signal or a group of signals designed to control transceivers in the address circuitry 22 and data circuitry 28 during the first data beat of a transaction (or the second data beat if the transaction is a partial transaction). The FORCE_LT signal 52a may also be used to transfer subsequent data beats which are loaded into or retrieved from a first location of a data buffer in the bank of data buffers 42a, 42b of the gate array 40 (FIG. 2) during a transaction. The second synchronous state machine 52 also generates a signal 52b, i.e., FETCH, which is sent to the control logic 44 in gate array 40 to cause the control logic to retrieve a data buffer or more of data through the system bus interface 46 of the gate array 40 from main memory 12b on the system bus 12d (FIG. 1). Lastly, the second synchronous state machine 52 generates a signal 52d used to transfer transaction control to the second asynchronous state machine 53, i.e., SET_FLO_THRU.

With these signals, the first synchronous state machine 50 deasserts the NO_CONN_HOLD signal 50b allowing the first asynchronous state machine 51 to produce the FB_T_AK signal 51a and the FB_T_AI signal 51b to respond to the connection phase handshake signals sent by the bus master device as required by the asynchronous bus 13. Concomitant therewith, the first synchronous state machine 50 passes control of the transaction to the second synchronous state machine 52. The second synchronous state machine 52 responds to a beginning portion of the data transfer phase of a transaction before passing transaction control to the second asynchronous state machine 53 which produces signals which are sent to the asynchronous interface 20 handshake circuitry 24 to provide the actual data phase handshake signals on the asynchronous I/O bus 13. In one embodiment of the invention, the second asynchronous state machine 53 completes the data transfer phase of the transaction by transferring all data beats initiated by the bus master device between the I/O device and the asynchronous bus. A data beat is one transfer of data between two devices on the asynchronous bus over the data lines of the asynchronous bus, i.e., AD<31:0>and possibly AD<63:32>, D<127:64>, and D<255:128>. In another embodiment of the invention and the one which will be described herein, the second asynchronous state machine 53 transfers data beats between the I/O device and the asynchronous bus until a data buffer in the bank of data buffers 42a, 42b of the gate array 40 (FIG. 2) is filled (write) or emptied (read), and then passes control of the transaction back to the second synchronous state machine 52. The second synchronous state machine 52 then returns transaction control to the second asynchronous state machine 53 following the transfer of subsequent data beat to a first location in a data buffer (read) or from a first location in a data buffer (write).

Referring now to FIG. 8, a state diagram illustrating the operation of the second synchronous state machine 52 of FIG. 3 is shown. The second synchronous state machine 52 begins in an Idle_2 state and may transition to a Write state or a Read state. If the state equation: GO 50c AND (NOT READ 27c), is valid, then the second synchronous state machine 52 transitions to the Write state. The second synchronous state machine 52 enters the Write state following the assertion of the GO signal 50c by the first synchronous state machine 50 when the bus master device is initiating a write transaction, i.e., the READ signal 27c is deasserted. If the SYNCH_AS signal 36a deasserts, i.e., NOT SYNCH_AS 36a, while the second synchronous state machine is in the Write state, then the state machine transitions back to the Idle_52 state. If, however, the state equation: SYNCH_AS 36a AND BUFFER_AVAILABLE 44a AND (SYNCH_DS 36b AND (NOT S0 53a) OR (NOT SYNCH_DS 36b) AND S0 53a),
is or becomes valid while the state machine is in the Write state, then the state machine transitions to a 1st_Db state and asserts the FORCE_LT signal 52a.

The assertion of the SYNCH_DS signal 36b while the second asynchronous state machine 53 state bit signal S0 53a is deasserted (SYNCH_DS 36b AND (NOT S0 53a)) indicates the beginning of an odd data beat. The deassertion of the SYNCH_DS signal 36b while the second asynchronous state machine 53 state bit signal S0 53a is asserted ((NOT SYNCH_DS 36b) AND S0 53a) indicates the beginning of an even data beat. Both of these conditions will be discussed in more detail with regard to the second asynchronous state machine 53. If either of the above conditions is true and the SYNCH_AS signal 36a is asserted, the second synchronous state machine 52 responds by asserting the FORCE_LT signal 52a which during a write transaction causes the transceivers in the asynchronous interface 20 data circuitry 28 (FIG. 2) to receive data during the first data beat on the asynchronous I/O bus.

For most transactions, the second synchronous state machine 52 will respond to the first odd data beat, i.e., SYNCH_DS 36b and (NOT S0 53a). However, in the case of a partial transaction, the first synchronous state machine 50 responds to the first odd data beat which carries the mask data, and, therefore, the second synchronous state machine 52 responds to a first even data beat, i.e., (NOT SYNCH_DS 36b) AND S0 53a. The second synchronous state machine 52 need not check that the BUFFER_AVAILABLE signal 44b is asserted in order to respond to the first data beat (odd or even) of a write transaction, because it is implicit in the assertion of the GO signal 50c from the first synchronous state machine 50 that a data buffer is available. The GO signal 50c is not asserted unless the BUFFER_AVAILABLE signal 44a is asserted which indicates that a data buffer in the bank of data buffers 42a, 42b in gate array 40 (FIG. 2) is available to store data received from the asynchronous I/O bus 13 or the synchronous system bus 12d (FIG. 1). However, in responding to each data beat which is to be stored in a first location in a subsequent data buffer, the second synchronous state machine 52 does need to check that a data buffer is ready to store additional data, i.e., the BUFFER_AVAILABLE signal 44a is asserted.

While in the Idle_52 state, if the state equation: GO 50c AND READ 27c, is or becomes valid, then the second synchronous state machine 52 transitions to a Wt_Read state. The second synchronous state machine 52 enters the Wt_Read state following the assertion of the GO signal 50c by the first synchronous state machine 50 when the bus master device is initiating a read transaction, i.e., the READ signal 27c is asserted. The Wt_Read state is a wait state during which the asynchronous interface 20 data circuitry 28 (FIG. 2) is prepared to drive data onto the asynchronous bus (the number of wait states may vary depending on the characteristics of the asynchronous interface).

The second synchronous state machine 52 transitions from the Wt_Read state to a Read state automatically on the next transition of the CLK signal 38a. If the SYNCH_AS signal 36a deasserts, i.e., NOT SYNCH_AS 36a, while the second synchronous state machine is in the Read state, then the state machine transitions back to the Idle_52 state. If, however, the state equation: SYNCH_AS 36a AND BUFFER_READY 44b AND (SYNCH_DS 36b AND (NOT S0 53a) OR (NOT SYNCH_DS 36b) AND S0 53a), becomes valid while the state machine is in the Read state, then the state machine transitions to the 1st_Db state and asserts the FORCE_LT signal 52a. This state equation is similar to the state equation required to be valid for the state machine to transition from the Write state to the 1st Db state, except that this state equation requires the BUFFER_READY signal 44b to be asserted.

During a read transaction, the second synchronous state machine 52 waits until the system bus interface logic 46 in gate array 40 (FIG. 2) has retrieved necessary data from main memory 12b and filled at least one data buffer in the bank of data buffers 42a, 42b of the gate array 40 with necessary data before asserting the FORCE_LT signal 52a. During a read transaction, the FORCE_LT signal 52a is used to cause the transceivers in the asynchronous interface 20 address circuitry 22 and data circuitry 28 (FIG. 2) to place data to be sent in the first data beat (odd or even) onto the asynchronous I/O bus.

Following the 1st_Db state, the state diagram of FIG. 8 includes wait states Wait_6 and Wait_7. These wait states are here added to allow the I/O device to drive data from the bank of data buffers 42a, 42b in gate array 40 (FIG. 2) onto the asynchronous I/O bus in the case of a read transaction or to allow the I/O device to receive data from the asynchronous I/O bus and load the data into a data buffer in the bank of data buffers 42a, 42b in gate array 40 in the case of a write transaction (the number of wait states may vary depending on the characteristics of the asynchronous I/O bus, the asynchronous interface 20, and the gate array 40). When the data has been driven onto the asynchronous I/O bus and is valid in the case of a read or when the data has been loaded into a data buffer in the case of a write, the second synchronous state machine 52 transitions to the Async_Db state and asserts the SET_FLO_THRU signal 52d. The second asynchronous state machine 53 immediately asserts the FLO_THRU signal 53c upon detecting the assertion of the SET_FLO_THRU signal 52d. The second synchronous state machine 52 will receive the assertion of the FLO_THRU signal 53c prior to the next transition of the CLK signal 38a. The assertion of the SET_FLO_THRU signal 52d allows the second asynchronous state machine 53 to complete the transfer of the data beat (odd or even) and to respond to subsequent data beats in the transaction. This will be described in more detail with regard to the second asynchronous state machine 53.

While in the Async_Db state, if the transaction ends, signified by the deassertion of the SYNCH_AS signal 36a, the second synchronous state machine 52 transitions back to the Idle_52 state. Otherwise, the second synchronous state machine 52 remains in the Async_Db state until the second asynchronous state machine 53 passes transaction control back to the second synchronous state machine 52 by deasserting the FLO_THRU signal 53c, i.e., NOT FLO_THRU 53c. The second asynchronous state machine 53 may pass transaction control back to the second synchronous state machine 52 when a data buffer in the bank of data buffers 42a, 42b in gate array 40 (FIG. 2) has been filled or emptied depending on whether the transaction was a read or write transaction, respectively. With the deassertion of the FLO_THRU signal 53c, the second synchronous state machine 52 may transition to either the Write state or the Next_Buf state.

In the case of a write, i.e., NOT READ 27c, the second synchronous state machine 52 transitions from the Async_Db state to the Write state and waits for the assertion of the BUFFER_AVAILABLE signal 44a and for the beginning of the next data beat. The second synchronous state machine 52 needs to check that a data buffer in the bank of data buffers 42a, 42b is empty (available) and therefore, able to accept data from the asynchronous I/O bus before continuing to accept the next data beat in a write transaction. Thus, the second synchronous state machine 52 waits for the assertion of the BUFFER_AVAILABLE signal 44a.

In the case of a read, i.e., the READ signal 27c is asserted, the second synchronous state machine 52 transitions from the Async_Db state to wait state Next_Buf and asserts the FETCH signal 52b. In one embodiment of the invention, the FETCH signal 52b causes the control logic 44 in gate array 40 (FIG. 2) to cause a previously filled data buffer in the bank of data buffers 42a, 42b in gate array 40 to supply data to the asynchronous interface 20 and to cause the system bus interface logic 46 to retrieve subsequent necessary data from main memory 12b (FIG. 1) to fill the data buffer just emptied. In another embodiment of the invention where there may only be one data buffer or data buffers are not filled with data before it is needed, the FETCH signal 52b causes the control logic 44 in gate array 40 to cause the system bus interface logic 46 to retrieve subsequent necessary data from main memory 12b to fill a data buffer. This second embodiment may take more time due to the necessity of having the system bus interface logic 46 retrieve the necessary data. On the next transition of the CLK signal the second synchronous state machine transitions to the Read state to wait for the assertion of the BUFFER_READY signal 44b and the beginning of the next data beat.

The second synchronous state machine 52 may flow through the Write or Read state, 1st_Db, Wait_6, Wait_7, and Async_Db states and possibly the Next_buf state many times depending on the number of data buffers worth of data which is being transferred in the current transaction. As mentioned above, a second asynchronous state machine 53 could be designed such that it completes the transfer of all the data beats initiated by the bus master device and such that the second synchronous state machine 52 will only flow through the state diagram of FIG. 8 once, not including the Next_Buf state, i.e., in the Async_Db state the state machine would wait for the end of the transaction signified by the deassertion of the SYNCH_AS signal 36a and then transition to the Idle_52 state. However, in such an embodiment, the complications arising around different data buffers in the bank of data buffers 42a, 42b in gate array 40 (FIG. 2) supplying the data or the need to retrieve data from the main memory would complicate the second asynchronous state machine 53, and therefore, the second asynchronous state machine 53 of the preferred embodiment passes transaction control back to the second synchronous state machine 52 to respond to the transfer of each data beat to a first location in a subsequent data buffer.

Implementing the protocol of the beginning of the data phase as the second synchronous state machine 52 provides a slower state machine than if the protocol were implemented as a corresponding asynchronous state machine due to the necessity of synchronizing the FB_R_AS signal 24a, i.e., SYNCH_AS 36a, and the FB_R_DS signal 24b, i.e., SYNCH_DS 36b, (FIG. 2) as previously discussed. The second synchronous state machine 52 may also be slower than a corresponding asynchronous state machine, because the synchronous state machine will not change state until the appropriate state equation is true and the CLK signal transitions, whereas a corresponding asynchronous state machine will change state as soon as the appropriate state equation becomes true.

However, implementing the beginning of the data phase as the second synchronous state machine 52 allows the state machine to take different paths at stages in the first data transfer where a read or a write transaction have different requirements. As mentioned previously, asynchronous state machines allow only one state bit to change per state transition, and, therefore, synchronous state machines are generally better suited than asynchronous state machines for implementing different paths from one state into many other states. A synchronous state machine also allows wait states to be easily added to the many paths that may be required of the state machine to allow sufficient time for specific circuitry to be set up or for signals to propagate through specific circuitry. If the protocol of the beginning of the data phase were implemented as a corresponding asynchronous state machine, the corresponding asynchronous state machine would, in general, be very large requiring significantly more circuitry than the second synchronous state machine 52 due to the requirement of having only one state bit change per state transition and also due to the necessity of including hazard terms in the state equations, as previously discussed. Also, there exists the possibility that PAL stacking, as previously discussed, might partially negate the speed increase associated with an asynchronous state machine.

Referring again to FIG. 3, as previously mentioned, the second asynchronous state machine 53 receives a line carrying the LT_MASK signal 50e from the first synchronous state machine 50 and a line carrying the SET_FLO_THRU signal 52d from the second synchronous state machine 52. The second asynchronous state machine also receives lines carrying the FB_R_AS signal 24a and the FB_R_DS signal 24b from the asynchronous interface 20 handshake circuitry 24 (FIG. 2) and a line carrying the SLAVE signal 22a from the asynchronous interface 20 address circuitry 22. In addition, the second asynchronous state machine 53 receives lines carrying delayed versions of the FB_R_DS signal 24b, i.e., the NO_HOLD_ODD signal 48a and the NO_HOLD_EVEN signal 48b, from the delay logic 48 shown in FIG. 3.

The second asynchronous state machine 53 also receives a signal 44c, i.e., LAST_DB, indicating that the current data buffer having data loaded into it or removed from it in the bank of data buffers 42a, 42b of the gate array 40 (FIG. 2) can only store or provide, respectively, data sufficient for one more data beat. The control logic 44 in gate array 40 provides the LAST_DB signal 44c and has circuitry (not shown) for determining from the address and command information captured from the asynchronous I/O bus that only one data beat can be loaded into or removed from the current data buffer. Similar to the buffer available circuitry and buffer ready circuitry, the last data beat circuitry could be located in the slave controller 32 (FIG. 2).

As shown in FIG. 3, the delay logic 48 receives the FB_R_DS signal 24b and the FB_R_AS signal 24a from the asynchronous interface 20 handshake circuitry 24 (FIG.2). The delay logic 48 also receives the READ signal 27c and the DATA LINES<1:0> signals 27d from the asynchronous interface 20 command circuitry 27, and the state bit S0 signal 53a from the second asynchronous state machine 53. The DATA_LINES<1:0> signals 27d indicate which data lines will be used to transfer data during the current transaction.

In addition to the NO_HOLD_ODD signal 48a and the NO_HOLD_EVEN signal 48b, the delay logic 48 provides a BUFFER_DS signal 48c. This signal is sent to the control logic 44 of the gate array 40 (FIG. 2) and used by the control logic 44 to increment to the next location in the current data buffer. A counter in the control logic 44 will provide the LAST_DB signal 44c to the second asynchronous state machine 53.

The NO_HOLD_ODD signal 48a is used in relation to the assertion of the FB_R_DS signal 24b to signify that the odd data beat (the state bit S0 signal 53a is asserted) data has been captured from the asynchronous I/O bus in the case of a write (the READ signal 27c is deasserted) or that the odd data beat data has been placed on the asynchronous I/O bus in the case of a read (the READ signal 27c is asserted). The NO_HOLD_EVEN signal 48b is used in relation to the deassertion of the FB_R_DS signal 24b to signify that the even data beat (the state bit S0 signal 53a is deasserted) data has been captured from the asynchronous I/O bus in the case of a write or that the even data beat data has been placed on the asynchronous I/O bus in the case of a read. The delay logic 48 contains delay circuitry and control circuitry (not shown) to control the length of time the NO_HOLD_ODD signal 48a and the NO_HOLD_EVEN signal 48b are delayed in relation to the FB_R_DS signal 24b.

The length of time that the NO_HOLD_ODD signal 48a and the NO_HOLD_EVEN signal 48b are delayed in relation to the FB_R_DS signal 24b may vary depending upon the transaction. One factor in the amount of time needed is the number of data lines which will be used to transfer data, as indicated by the DATA_LINES<1:0> signals 27d. For example, if the data buffers in the bank of data buffers 42a, 42b in the gate array 40 (FIG. 2) are thirty-two bits wide, a thirty-two bit data width transaction on the asynchronous I/O bus would require less delay of the NO_HOLD_ODD signal 48a and the NO_HOLD_EVEN signal 48b in relation to the FB_R_DS signal 24b than a sixty-four bit data width transaction. This is because a sixty-four bit data width transaction requires that two locations be retrieved from a data buffer in the case of a read and that two locations be loaded into a data buffer in the case of a write, while a thirty-two bit transaction requires only one location to be retrieved or loaded. Similarly, a one-hundred and twenty-eight bit data width transaction on the asynchronous I/O bus would require a longer delay of the NO_HOLD_ODD signal 48a and the NO_HOLD_EVEN signal 48b in relation to the FB_R_DS signal 24b than a sixty-four bit data width transaction.

As shown in FIG. 3, the second asynchronous state machine 53 provides lines carrying the data phase handshake signals 53d and 53e, i.e., FB_T_DK and FB_T_DI, respectively. As mentioned previously, the second asynchronous state machine 53 further provides lines to the second synchronous state machine 52 carrying a second asynchronous state machine 53 state bit, i.e., the S0 signal 53a, and the FLO_THRU signal 53c. With these signals, the second asynchronous state machine 53 can respond to data beats initiated by the bus master device and return transaction control to the second synchronous state machine 52 either at the end of the transaction, i.e., the FB_R_AS signal 24a deasserts, or following the filling or emptying of a data buffer, i.e., the LAST_DB signal 44c asserts.

Referring now to FIG. 9, a state diagram illustrating the operation of the second asynchronous state machine 53 of FIG. 3 is shown. The second asynchronous state machine 53 begins in an End_Even state, represented by state bits S0 (signal S0 53a) and S1 equal to "00", with the FB_T_DK signal 53d and the FB_T_DI signal 53e deasserted. The state machine asserts the FB_T_DI signal 53e at the beginning of a transaction, while remaining in the End_Even state, when the FB_R_AS signal 24a and the SLAVE signal 22a become asserted, i.e., FB_R_AS 24a AND SLAVE 22a, in preparation for future use. The second synchronous state machine 53 transitions to a Beg_Odd state, represented by state bits S0 and S1 equal to "01", when the state equation: FB_R_AS 24a AND SLAVE 22a AND FB_R_DS 24b, becomes valid. The assertion of FB_R_DS 24b indicates that the bus master device is initiating the first odd data beat. Upon the transition to the Beg_Odd state, the second asynchronous state machine 53 asserts the FB_T_DK signal 53d and continues to assert the FB_T_DI signal 53e.

While in the Beg_Odd state, if the state equation: FB_R_AS 24a AND SLAVE 22a AND FB_R_DS 24b AND NO_HOLD_ODD 48a AND (FLO_THRU 53c OR LT_MASK 50e), becomes valid, then the state machine will transition to the End_Odd state, represented by state bits S0 and S1 equal to "11" and deassert the FB_T_DI signal 53e to complete the first odd data beat while continuing to assert the FB_T_DK signal 53d. The assertion of the NO_HOLD_ODD signal 48a indicates that the data on the asynchronous I/O bus has been captured in the case of a write or that the data has been placed on the asynchronous I/O bus in the case of a read. The assertion of the LT_MASK signal 50e indicates that the transaction is a partial transaction and the first synchronous state machine 50 has caused the mask data to be latched. The assertion of the FLO_THRU signal 53c indicates that the second synchronous state machine 52 has asserted the SET_FLO_THRU signal 52d which indicates that the transaction is not a partial and that the data for the first odd data beat has been stored in a data buffer of the bank of data buffers 42a, 42b of the gate array 40 (FIG. 2) in the case of a write or that the data has been placed on the asynchronous I/O bus in the case of a read. The assertion of the SET_FLO_THRU signal 52d also indicates that the second synchronous state machine 52 has passed transaction control to the second asynchronous state machine 53 such that subsequent data beats initiated by the bus master device should be responded to by the second asynchronous state machine 53 until the LAST_DB signal 44c asserts.

As previously mentioned, the assertion of the SET_FLO_THRU signal causes the second asynchronous state machine 53 to immediately assert the FLO_THRU signal 53c (the equation is not shown in FIG. 9) to the second synchronous state machine 52. The second asynchronous state machine 53 will keep the FLO_THRU signal 53c asserted until the control logic 44 in gate array 40 (FIG. 2) asserts the LAST_DB signal 44c and the second asynchronous state machine 53 has transferred that last data beat to or from a data buffer in the bank of data buffers 42a, 42b in gate array 40, or until the FB_R_AS signal 24a has deasserted.

While in the End_Odd state, if the state equation: FB_R_AS 24a AND SLAVE 22a AND (NOT FB_R_DS 24b), becomes valid, the state machine transitions to the Beg_Even state, represented by state bits S0 and S1 equal to "10", and asserts the FB_T_DI signal 53e in preparation for later use while continuing to assert the FB_T_DK signal 53d. The deassertion of the FB_R_DS signal 24b while the FB_R_AS signal 24a is asserted indicates that the bus master device is initiating an even data beat.

While in the Beg_Even state, if the state equation: FB_R_AS 24a AND SLAVE 22a AND (NOT FB_R_DS 24b) AND NO HOLD EVEN 48b AND FLO_THRU 53c, becomes valid, the state machine transitions to the End_Even state and deasserts the FB_T_DK signal 53d to complete the even data beat while continuing to assert FB_T_DI signal 53e. The assertion of the NO_HOLD_EVEN signal 48b indicates that the data for the even data beat has been captured from the asynchronous I/O bus and stored in a data buffer of the bank of data buffers 42a, 42b of the gate array 40 (FIG. 2) in the case of a write or that the data has been retrieved from a data buffer and placed on the asynchronous I/O bus in the case of a read. The assertion of the FLO_THRU signal 53c indicates that the SET_FLO_THRU signal 52d has asserted which indicates that the second synchronous state machine 52 has captured data for the first even data beat in the case of a write or provided data for the first even data beat in the case of a read and has passed transaction control to the second asynchronous state machine 53 following the first synchronous state machine 50 latching the mask data, or the assertion of the SET_FLO_THRU signal 52d indicates that the second synchronous state machine 52 is continuing to pass transaction control to the second asynchronous state machine 53.

The states of the second asynchronous state machine 53 will be repeated for as many data beats as are initiated by the bus master device or until the control logic 44 in the gate array 40 (FIG. 2) asserts the LAST_DB signal 44c.

While in the End_Odd state, if the FB_R_AS signal 24a deasserts signifying the end of the transaction, both the FB_T_DK signal 53d and the FB_T_DI signal 53e will deassert (not shown in FIG. 9) and the second asynchronous state machine 53 will transition to the Beg_Even state. Following the deassertion of the NO_HOLD_EVEN signal 48b, the second asynchronous state machine 53 will transition to the End Even state and wait for the next transaction. The state machine follows this sequence in order to insure that only one state bit changes per state transition.

Here the second asynchronous state machine 53, similar to the first asynchronous state machine 51, is a simple state machine comprised of four states. Therefore, the requirement of having only one state bit change per state transition does not effect the number of state bits necessary to implement the asynchronous state machine. A truth table similar to the one of FIG. 6 and a Karnaugh map similar to the one of FIG. 7 would be provided for each state bit signal and output signal of the second asynchronous state machine 53. From the Karnaugh maps, the equations for the state bits and output signals could be determined, including hazard terms, as outlined above. Due to the fact that there are few determinations to be made in transferring data beyond the transfer of a data beat which is to be stored in or removed from a first location in a data buffer, the second asynchronous state machine does not need to make many determinations. Therefore, there is only a small increase in circuitry required to implement the second asynchronous state machine 53 asynchronously as opposed to the circuitry which would be required to implement a corresponding synchronous state machine.

The data transfer phase of a transaction generally comprises most of the transaction. Therefore, a transaction may be completed significantly faster if the data can be transferred at a faster rate. Once the second asynchronous state machine 53 has transaction control, the data transfer will take place significantly faster than a corresponding synchronous state machine would allow for the reasons outlined above.

The slave controller 32 (FIG. 2) described above allows a fast data transfer by implementing the data phase protocol through the second asynchronous state machine 53. However, the circuitry of the slave controller 32 is at a minimum due to the implementation of the connection phase protocol and beginning of the data phase protocol through the first and second synchronous state machines 50 and 52, respectively.

The master and slave controllers 34, 32, respectively, are totally independent, and, therefore, they may both be implemented via a combination of synchronous and asynchronous state machines as described above. Alternatively, either one may be implemented through strictly synchronous circuitry while the other is implemented using a combination of synchronous and asynchronous state machines, as described above. If the master controller 34 is implemented via a combination of synchronous and asynchronous state machines as outlined above, it would be similar to the slave controller 32 except that first and second asynchronous state machines would receive the slave handshake signals from the asynchronous I/O bus and provide the master handshake signals to the asynchronous I/O bus, and the master controller 34 would provide the address and command information and receive the status information. The signals necessary to implement the master controller 34 in accordance with the invention are not shown in FIG. 2 for simplicity.

Although the preferred embodiment of the invention has been described in reference to an I/O device providing data transfer between a synchronous system bus and an asynchronous I/O bus, it will become apparent to one of skill in the art that the data transfer device may interface other synchronous systems to asynchronous busses and devices. For example, the data transfer device described above may be used to provide data transfer between a synchronous memory device or CPU and an asynchronous bus on which they are resident. Two data transfer devices may be used to interface to two asynchronous busses and to transfer data between the two asynchronous buses, i.e., the system bus is asynchronous rather than synchronous as described above. The complexities of the asynchronous busses may make the speed reduction of the data transfer device worth while due to the circuitry savings experienced by using the data transfer devices.

Having described preferred embodiments of the invention, it will now become apparent to one of skill in the art that other embodiments incorporating their concepts may be used. Accordingly, it is submitted that the invention should not be limited to the disclosed embodiments, but rather should be limited by the spirit and scope of the appended claims.

What is claimed is:

1. A data transfer device, comprising;

means for controlling data transfer between an asynchronous bus and said data transfer device including
a synchronous logic network to provide a transaction connection between said asynchronous bus and said data transfer device during an initial phase of said transaction;
an asynchronous logic network provide data transfer between said asynchronous bus and said data transfer device during a subsequent phase of said transaction;
a data buffer coupled to said asynchronous bus interfacing means and to said controlling means, to store data to be sent to said asynchronous bus and to store data received from said asynchronous bus;
said synchronous logic network further comprising means for determining that said data buffer stores data to be transferred during said transaction and for passing transaction control to said asynchronous logic network, during transfer of data to said asynchronous bus;
means for determining that said data buffer is available to store data received during said transaction and for passing transaction control to said asynchronous logic network, during receiving data from said asynchronous bus;
said asynchronous logic network further comprising means for transferring the data stored in said data buffer for said transaction and for returning transaction control to said synchronous logic network, during transfer of data to said asynchronous bus; and
means for storing data received from said asynchronous bus in said data buffer for said transaction and for returning transaction control to said synchronous logic network, during receiving data from said asynchronous bus;
means, coupled to said controlling means, for interfacing said data transfer device to said asynchronous bus.

2. The data transfer device according to claim 1, wherein said synchronous logic network further comprises;

means for determining that said data buffer contains additional data to be transferred for said transaction and for passing transaction control back to said asynchronous logic network during transfer of data to said asynchronous bus; and
means for determining that said data buffer is available to store additional data received from said asynchronous bus for said transaction and for passing transaction control back to said asynchronous logic network, during receiving data from said asynchronous bus.

3. The data transfer device according to claim 2, wherein said data buffer is a first data buffer and said data transfer device further comprises;

at least a second data buffer; and wherein said synchronous logic network further comprises;
  means for determining that one of said data buffers contains data to be transferred to said asynchronous bus for said transaction and for passing transaction control to said asynchronous logic network; and
  means for determining that one of said data buffers is available to store data received from said asynchronous bus for said transaction and for passing transaction control to said asynchronous logic network.

4. The data transfer device according to claim 1, wherein said device further comprises;
  means responsive to at least a portion of an address and a command provided by said asynchronous bus for determining a storage location in said data buffer.

5. The data transfer device according to claim 1, wherein said device further comprises;
  means responsive to at least a portion of an address and a command provided by said asynchronous bus for determining an ending location in said data buffer.

6. The data transfer device according to claim 1, wherein said synchronous logic network comprises;
  a first synchronous state machine, comprising;
    means for providing a latch signal to capture address and command information present on said asynchronous bus; and
    means for providing a hold signal to stall said asynchronous logic network and for determining that said data transfer device is ready to commence said subsequent data transfer phase of said transaction.

7. The data transfer device according to claim 6, wherein said first synchronous state machine is responsive to data buffer status signals, command decode signals, and an address decode signal to determine if said data transfer device is ready to commence said subsequent data transfer phase of said transaction.

8. The data transfer device according to claim 6, wherein said asynchronous logic network comprises;
  a first asynchronous state machine, comprising;
    means responsive to said hold signal and to an address strobe signal from said asynchronous bus for providing at least one connection control signal to said asynchronous bus to indicate that said subsequent data transfer phase may commence.

9. The data transfer device according to claim 8, wherein said first synchronous state machine further comprises;
  means for providing a data phase signal.

10. The data transfer device according to claim 9, wherein said synchronous logic network further comprises;
  a second synchronous state machine, comprising;
    means responsive to said data phase signal and to said address strobe signal and to a data strobe signal from said asynchronous bus to control a beginning of said subsequent phase of said transaction; and
    means for providing a data hold signal to stall said asynchronous logic network and for determining that said data transfer device is ready to transfer data for said transaction.

11. The data transfer device according to claim 10, wherein said second synchronous state machine comprises;
  means, responsive to data buffer status signals, command decode signals, and synchronized control signals from said asynchronous bus, for determining if said data transfer device is ready to transfer data for said transaction.

12. The data transfer device according to claim 11, wherein said asynchronous logic network further comprises;
  a second asynchronous state machine, comprising;
    means responsive to said data hold signal and to said data strobe signal, for providing data transfer signals to said asynchronous bus to transfer data between said data transfer device and said asynchronous bus.

13. The data transfer device according to claim 1, wherein said controlling means, comprises;
  means for initiating transactions on said asynchronous bus.

14. The data transfer device according to claim 1, wherein said controlling means, comprises;
  means for responding to transactions received from said asynchronous bus.

15. The data transfer device according to claim 1, wherein said controlling means is a first controlling means for responding to transactions received from said asynchronous bus, and wherein said data transfer device further comprises;
  a second controlling means for initiating transactions to be sent to said asynchronous bus.

16. The data transfer device according to claim 1, wherein said device further comprises;
  means for interfacing to a synchronous system bus coupled to said data transfer device to provide for data transfer between said synchronous system bus and said asynchronous bus.

17. The data transfer device according to claim 16, wherein said system bus is synchronous to a first clock signal and said synchronous logic network is synchronous to a second clock signal.

* * * * *